United States Patent [19]

Mitchell

[11] Patent Number: 5,614,912
[45] Date of Patent: Mar. 25, 1997

[54] RADAR PROCESSING METHOD AND APPARATUS

[75] Inventor: Edmund J. Mitchell, Newton, Mass.

[73] Assignee: The Mitre Corporation, Bedford, Mass.

[21] Appl. No.: 396,279

[22] Filed: Feb. 28, 1995

Related U.S. Application Data

[63] Continuation of Ser. No. 756,615, Sep. 9, 1991, abandoned.

[51] Int. Cl.$^6$ .................................................. G01S 13/46
[52] U.S. Cl. .......................... 342/146; 342/450; 342/451
[58] Field of Search .......................... 342/59, 146, 156, 342/158, 450, 451, 463

[56] References Cited

U.S. PATENT DOCUMENTS

| | | | |
|---|---|---|---|
| 3,246,327 | 4/1966 | Vogel | 342/156 |
| 3,487,462 | 12/1969 | Holberg | 342/59 |
| 3,735,333 | 5/1973 | Balser et al. | 342/26 X |
| 3,939,475 | 2/1976 | Lewis | 342/129 |
| 4,048,637 | 9/1977 | Jacomini | 342/161 |
| 4,281,327 | 7/1981 | Frazier et al. | 342/135 |
| 4,370,656 | 1/1983 | Frazier et al. | 342/458 |
| 4,438,439 | 3/1984 | Shreve | 342/449 |
| 4,613,867 | 9/1986 | Golinsky | 342/458 |
| 4,642,648 | 2/1987 | Hulland et al. | 342/455 |
| 4,644,356 | 2/1987 | Yamano | 342/160 |
| 4,670,757 | 6/1987 | Munich et al. | 342/450 |
| 4,746,924 | 5/1988 | Lightfoot | 342/453 |
| 4,768,034 | 8/1988 | Preikschat et al. | 342/80 |
| 4,806,936 | 2/1989 | Williams et al. | 342/126 |
| 4,990,920 | 2/1991 | Sanders, Jr. | 342/14 |
| 5,107,268 | 4/1992 | Sturm et al. | 342/36 |
| 5,113,193 | 5/1992 | Powell et al. | 342/25 |
| 5,138,321 | 8/1992 | Hammer | 342/36 |

*Primary Examiner*—John B. Sotomayor
*Attorney, Agent, or Firm*—Choate, Hall & Stewart

[57] ABSTRACT

Radar processing method and apparatus in which the receiver need not accept the transmitted signal directly in order to determine the timing information required to locate targets. Processing apparatus according to the invention employs signals transponded or reflected from at least two targets to compute target and/or transmitter locations, or to simulate the transmitted signal for input to a conventional bistatic processor.

26 Claims, 8 Drawing Sheets

RADAR PROCESSING METHOD AND APPARATUS

This is a continuation of application Ser. No. 07/756,615 filed on Sep. 9, 1991 now abandoned.

BACKGROUND OF THE INVENTION

This invention relates to systems for locating transponders or reflectors (targets) in space by receiving and processing energy reflected or transponded from the targets, and more particularly to a system for extracting timing information required to locate targets directly from energy received from two or more targets when the transmitter of the energy is not detectable or is not processed at the receiver.

For many years, engineers have employed "bistatic" processing to locate energy emanating from a point in space in response to illumination by energy from a transmitter offset from the receiver. In one example, a ground-based scanning radar illuminates an airborne vehicle and energy emanates from the vehicle in the form of either reflections or separate emissions from an onboard transponder triggered by receipt of the radar energy. The energy emanating from the airborne vehicle is received and processed at a receiver removed an arbitrary distance from the ground-based radar. The only requirement on the receiver site (which can be an airborne site) is that both the transmitter site and the airborne vehicle must be close enough to the receiver site for energy to be detected and processed at that site.

Conventional bistatic processing techniques require the measurement of the difference in time of arrival of energy from the transmitter relative to energy emanating from the target. Knowledge of the differential time of arrival (DTOA) and the location of both the receiver and the transmitter is used to place the target on an ellipse of revolution (ellipsoid). Any of a number of techniques can be used to determine the direction of arrival (DOA) of the target energy relative to either the receiver or the transmitter (or both). The intersection of the ellipsoid and the DOA form an unambiguous estimate of the location of the target.

The bistatic process described above suffers from one significant drawback: the receiver must process energy received directly from the transmitter. If energy is transponded from a transponder in space, this requirement generally leads to the need for two receivers, because the transponder is generally at a different frequency than the transmitter. An even more restrictive implication is that the signal from the transmitter must be detectable and processable at the receiver. If the transmitter is shadowed by a mountain, for example, target energy may be readily processed at the receive but bistatic processing is not possible because direct transmitter energy is not available at the receiver.

SUMMARY OF THE INVENTION

In one aspect, the invention provides an apparatus for locating targets. The apparatus includes a transmitter of electromagnetic radiation for directing radiation to at least two targets, and a receiver of electromagnetic radiation for intercepting the radiation reflected or transponded from the targets. Importantly, the receiver need not be positioned within line-of-sight of the transmitter. The apparatus further includes a processor for accepting signals from the receiver which characterize the radiation reflected or transponded from the targets. Programs running in the processor compute the locations of any of the targets from the signals. For some embodiments, the receiver has direction-finding capability. For some embodiments, the location of the transmitter is stored in the processor.

In one embodiment, the processor accepts signals characterizing the radiation reflected or transponded from two targets, and the programs compute the locations of the two targets. In another embodiment, the processor accepts signals characterizing the radiation reflected or transponded from three targets, and the programs compute the locations of the three targets. In yet another embodiment, the processor accepts signals characterizing the radiation reflected or transponded from four targets, and the programs compute the locations of the four targets and the transmitter.

In another aspect, the invention provides an apparatus for locating targets, the apparatus including at least two transmitters of electromagnetic radiation for directing radiation to at least two targets, and a receiver of electromagnetic radiation for intercepting the radiation reflected or transponded from the targets. Again, the receiver need not be positioned within line-of-sight of the transmitters. The apparatus further includes a processor for accepting signals from the receiver which characterize the radiation reflected or transponded from the targets. Programs running in the processor compute the locations of any of the targets from the signals. For some embodiments, the locations of the transmitters are stored in the processor.

In one embodiment, the processor accepts signals characterizing the radiation reflected or transponded from two targets and the programs compute the locations of the two targets.

In yet another aspect, the invention provides an apparatus for locating targets, the apparatus including a transmitter of electromagnetic radiation for directing radiation in the form of pulses at a pulse repetition interval and a phase to at least two targets, and a receiver of electromagnetic radiation for intercepting radiation reflected or transponded from the targets. Again, the receiver need not be positioned within line-of-sight of the transmitter. The apparatus further includes a processor for accepting signals from the receiver which characterize the radiation reflected or transponded from the targets. Programs running in the processor compute the pulse repetition interval and phase of the transmitted radiation, and produce a signal simulating the transmitter pulses. A bistatic processor accepts the signals characterizing the radiation reflected or transponded from the targets and the signal simulating the transmitter pulses, and computes the locations of any of the targets. For some embodiments, the receiver has direction-finding capability. For some embodiments, the location of the transmitter is stored in the processor.

In one embodiment, the processor accepts signals characterizing the radiation reflected or transponded from two targets, and the bistatic processor computes the locations of the two targets.

In some embodiments, the signals characterizing the radiation reflected or transponded from the targets which are accepted by the bistatic processor are accepted from a second receiver of electromagnetic radiation. This receiver also need not be positioned within line-of-sight of the transmitter.

In yet another aspect, the invention provides an apparatus for locating a transmitter which is directing electromagnetic radiation to at least two targets. The apparatus includes a receiver of electromagnetic radiation for intercepting radiation reflected or transponded from the targets. Again, the receiver need not be positioned within line-of-sight of the transmitter. The apparatus further includes a processor for accepting signals from the receiver which characterize the radiation reflected or transponded from the targets. Programs running in the processor compute the location of the transmitter from the signals.

In one embodiment, the locations of two targets are stored in the processor and the processor accepts signals characterizing the radiation reflected or transponded from the two targets.

In all embodiments of apparatus according to the invention, the apparatus may further include a display for displaying computed target and/or transmitter locations. The apparatus may include means for inputting a computed target and/or transmitter location into a control system guiding a projectile aimed at the target or transmitter. The apparatus may include means for inputting a computed target and/or transmitter location into a control system guiding target and/or transmitter trajectory.

In another aspect, the invention provides a method for locating targets, the method including transmitting electromagnetic radiation to at least two targets, and receiving the radiation reflected or transponded from the targets. The method further includes computing the locations of any of the targets from signals derived only from the electromagnetic radiation reflected or transponded from the targets.

In another aspect, the invention provides a method for locating targets, the method including transmitting electromagnetic radiation in the form of pulses at a pulse repetition interval and a phase to at least two targets, and receiving the radiation reflected or transponded from the targets. The method further includes computing the pulse repetition interval and phase of the transmitted radiation from signals derived only from the electromagnetic radiation reflected or transponded from the targets, then producing a signal simulating the transmitted pulses. Finally, the method includes performing bistatic processing on the electromagnetic radiation reflected or transponded from the targets and the signal simulating the transmitted pulses to compute the locations of any of the targets.

In yet another aspect, the invention provides a method for locating transmitters, the method including transmitting electromagnetic radiation from a transmitter to at least two targets, and receiving the radiation reflected or transponded from the targets. The method further includes computing the locations of the transmitter from signals derived only from the electromagnetic radiation reflected or transponded from the targets.

DESCRIPTION OF THE PREFERRED EMBODIMENT

Figure 1:
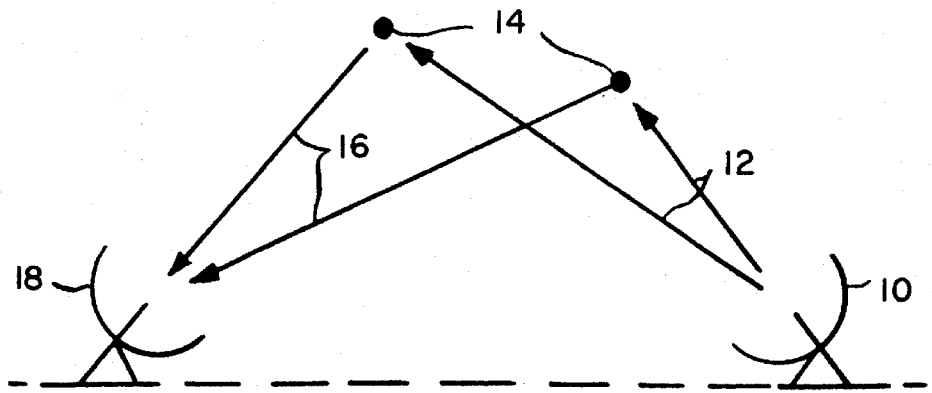
FIG. 1 is a depiction of one scenario in which the radar processing method of the present invention may be employed.

A depiction of one scenario in which the radar processing method of the present invention may be employed is illustrated in FIG. 1. In this figure, a transmitter 10 transmits a signal 12 of pulses. Both the pulse repetition interval (PRI) and the antenna scan rate may be variable for a given transmitter 10. The signal 12 from the transmitter 10 becomes incident on at least two targets 14. The signals 16 transponded or reflected from the targets 14 are received by a receiver 18.

The radar processing method of the present invention extracts timing information associated with the transmitted signal 12 by processing received signals 16, without the need to process the signal 12 as required in conventional bistatic processing methods. The technique is useful when the receiver 18 is not in the line-of-sight of the transmitter 10, and can be used to simulate (generate an estimate of) the transmitted signal and/or uniquely determine the location of two or more targets or transmitters in space.

In order to extract the required information from only the signals 16 reflected or transponded from the target, certain parameters relating to these signal must be measured. These parameters may include:

1) lines of bearing to each target as seen from the receiver, 2) differential bistatic propagation times (transmitter to target to receiver) between one target and each of the other targets, and 3) angular separations between one target and each of the other targets as seen from a second point in space (e.g., a transmitter site).

The lines of bearing can be measured directly from the energy emitted from each target using a direction finding system at the receiver which determines the direction of arrival (DOA) of each received signal.

The differential bistatic propagation times can be determined from a knowledge of the transmitter PRI. The PRI may either be known a priori, measured during each target illumination interval (assuming that more than one pulse is reflected or transponded during the interval), or estimated from other measured signal characteristics and known relationships to the PRI. The times of arrival (TOA) of pulses from two or more target sites are measured as the sites are sequentially or concurrently illuminated by a transmitter. The difference in time of arrival (DTOA) between pulses is formed. For a transmitter with a stable PRI, these differences in the times of pulse arrival represent the difference between the propagation time from the transmitter to the receiver via two different targets, plus an unknown number of pulse intervals, i.e., $$DTOA = \left( \frac{(DT1 + DR1) - (DT2 + DR2)}{c} \right) + n\delta$$

where DT1 is the transmitter to target 1 distance, DR1 is the receiver to target 1 distance, DT2 is the transmitter to target 2 distance, DR2 is the receiver to target 2 distance, c is the speed of light, δ is the PRI, and n is an arbitrary integer.

Typically the PRI is much larger than the difference in the time for pulses to propogate from transmitter to receiver via two different target sites. Thus, n is generally the result of a time lag between the sequential illumination of two target sites, and will be zero if the two sites are concurrently illuminated. The integer n adds an arbitrary term to the above equation which must be removed to obtain a relevant estimate of the differential bistatic propogation times. However, the integer n is used in combination with the scan rate of the transmitter to determine angular separation, as described below.

Assuming δ/2 is greater than $$\frac{(DT1 + DR1) - (DT2 + DR2)}{c},$$

the term nδ can be eliminated as follows. First, the DTOA is divided by δ to form an integer plus a fraction. Rounding off the result produces the "unknown" integer n (e.g., 47.0001 or 46.9999 produce the integer 47 and the fraction +0.0001 in the first instance and −0.0001 in the second instance). Multiplying the fractional part of the "division and rounding process" by δ produces an estimate of the differential bistatic propogation time, herein denoted DTOA':

$$DTOA' = \frac{(DT1 + DR1) - (DT2 + DR2)}{c}$$

The angular separation measurements require a knowledge of the transmitter scan rate. The scan rate may be known a priori or can be estimated by averaging measurements of the difference in successive times of illumination of the same target by the same transmitter. The times of receipt of pulses from the targets can be compared to the scan rate to determine target angular separations as seen from the transmitter site.

For the case of 2 targets, the 3 measurements provide 4 parameters: the lines of bearing to each target from the receiver site, the differential bistatic propagation time between the two targets, and the angular separation between the targets as seen from the transmitter site. There are also 4 unknowns, the x and y coordinates of each of the two targets. (Small errors due to altitude are neglected in this planar analysis.) This forms a system of 4 non-linear equations in 4 unknowns which, under the right conditions, can be solved to determine the 2 target locations. The method can be applied to larger numbers of targets, for example, by solving for the target locations two at at time.

Alternatively, it may be the case that the 2 target locations are known and the location of the transmitter is of interest. In another embodiment of the invention, 2 target returns from 2 targets with known locations are used to measure the differential bistatic propogation time and the angular separation. Under most geometries of interest, the resulting 2 equations in 2 unknowns can be solved to determine the location of the transmitter in the absence of any of the line of bearing measurements. For this application, therefore, the receiver does not require direction finding capability. Multiple transmitters can be located via multiple application of this method, or by an implementation involving more than 4 targets.

It is easy to show that as targets are added, the system of equations becomes overdefined. For N targets, 2N equations are required to determine the 2N coordinates of the targets. However, N targets provide 2N plus N−2 equations. Therefore, the number of extra equations is always 2 less than the number of targets. For example, 3 target returns can be used to measure 3 lines of bearing, 2 differential bistatic propogation times and 2 angular separations. This yields a system of 7 equations in 6 unknowns. These sets of equations can be solved using a least mean square (LMS) or similar technique to reduce effects of system measurement errors. Therefore, in another embodiment of the invention, these 7 equations are solved to determine the LMS estimates of the locations of the 3 targets. In addition, if only the transmitter range or transmitter bearing relative to the receiver is known or input to the analysis (instead of transmitter location), there are 7 unknowns, and the 3-target system of equations is not overconstrained. In this case, the 3 target locations and the transmitter location can be estimated.

Alternatively, extra equations can be used to determine the location of a transmitter site when both coordinates are unknown in addition to the location of targets. Since an unknown transmitter location adds 2 additional unknowns to the system of equations, measurement of signals from 4 targets is required to produce a unique solution. In one embodiment, 4 target returns are used to measure 4 lines of bearing, 3 differential bistatic propogation times, and 3 angular separations. These 10 measurements can be used to determine the locations of the 4 targets and the transmitter site with a system of 10 equations in 10 unknowns. The method can be applied to larger numbers of targets, for example, by solving them four at a time. The four target analysis is particularly appropriate when the transmitter or receiver is moving since the relative positions of the transmitter and receiver need not be known and are a biproduct of the calculations.

In another embodiment of the invention, 2 target returns triggered from 2 geographically separate transmitter sites are used to measure 2 differential bistatic propogation times and 2 angular separations. These 4 measurements can be used to determine the location of the 2 targets in the absence of measurements of the lines of bearing. The use of 2 transmitters therefore removes the requirement for a direction finding capability at the receiving site.

Any implementation that produces target and transmitter location estimates can also produce an estimate of a clock synchronized with the transmitter signal. Therefore, in another aspect of the invention, such a clock is generated and used to process returns using conventional bistatic processing. In other words, the information obtained directly from the transmitter in conventional bistatic systems is simulated using the returns of two or more targets.

Figure 2:
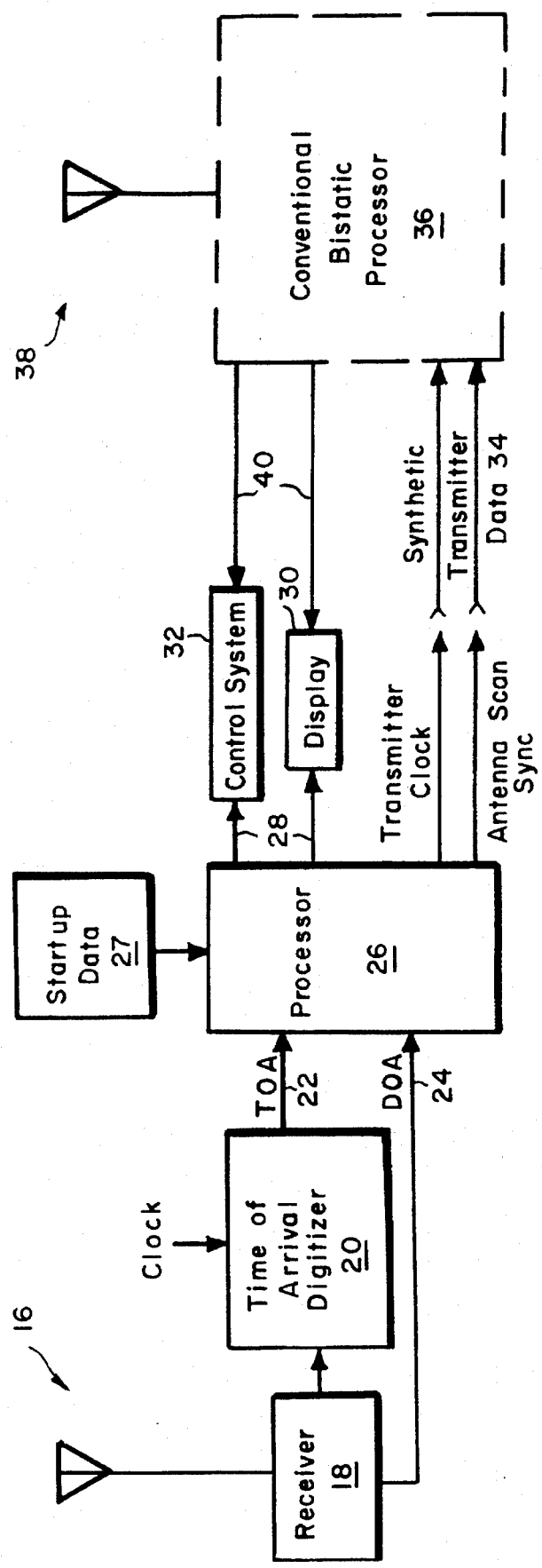
FIG. 2 is a block diagram of radar processing apparatus according to one embodiment of the invention.

A block diagram of radar processing apparatus according to one embodiment of the present invention is illustrated in FIG. 2. The signals 16 reflected or transponded from the targets are received by receiver 18 which includes an antenna that operates at transmitter or transponder frequencies of interest. The received signal is applied to a of arrival digitizer 20, which determines the time of arrival (TOA) 22 of each received signal. For some embodiments, the receiver 18 has direction finding capability and determines the direction of arrival (DOA) 24 of each signal. Data from the receiver 18 and the time of arrival digitizer 20 are input to a processor 26 in which programs are running to perform signal processing according to the invention. Startup data 27, which may include transmitter location with respect to the receiver and/or target specific recognition data are also input to processor 26. The processor 26 computes timing information associated with the transmitted signal and/or the location of one or more of the targets or transmitters.

If locations of any of the targets or transmitters are computed, the location data 28 may be sent to a display 30. This may be the case when the invention is used as part of an air traffic control system, for example. In other embodiments, the location data 28 may be sent to a control system 32, where it is used to control a process. This may be the case when the invention is used as part of missile guidance or radar jamming systems, for example.

In some embodiments, the processor 26 is programmed to compute only the timing information, including transmitter scanning and north reference data as well as the PRI and the phase of the pulse train, from the signals received from at least two targets. This computation results in a simulation 34 of the transmitted signal which may then be sent to a conventional bistatic processor 36 to compute the location of targets or transmitters. The signals 38 received and processed by the conventional bistatic processor 36 with the transmitter simulation of the invention may be the signals 16, or may be signals received by an entirely separate receiver apparatus. In either case, the resulting location data 40 can then be sent to display 30 and/or control system 32.

For single transmitter/two target analysis, the startup data 27 includes the transmitter location relative to the receiver location. For single transmitter/three target analysis, the startup data includes either the transmitter range or transmitter bearing relative to the receiver. For single transmitter/four target analysis, no transmitter-related startup data is required.

In embodiments which do not employ direction finding, such as the two target/two transmitter implementation, a technique must be provided for identifying responses from individual targets regardless of which transmitter is initiating the response. Techniques for making this pulse group association/identification with the correct target include (1) when available, reading a response ID code that comes with each pulse group and identifies each target with a different ID number code (e.g., as called out in International Civil Aviation Organization standards), (2) processing unintentional modulation on individual pulses (UMPO) so that pulses can be associated with a unique target transponder (e.g., pulses/pulse groups of the same amplitude or the same fine grain frequency may be associated with each other and a specific transponder), or (3) starting up in a sparse environment and, using trial and error techniques, associating two targets with tracks and transmitter scan rates and PRI transponder responses. In the last implementation, if the output is used to drive a conventional bistatic processor, subsequent processable targets can be selected and processed unambiguously using the developed location data and the known or estimated transmitter scan rates and north reference times.

Figure 3:
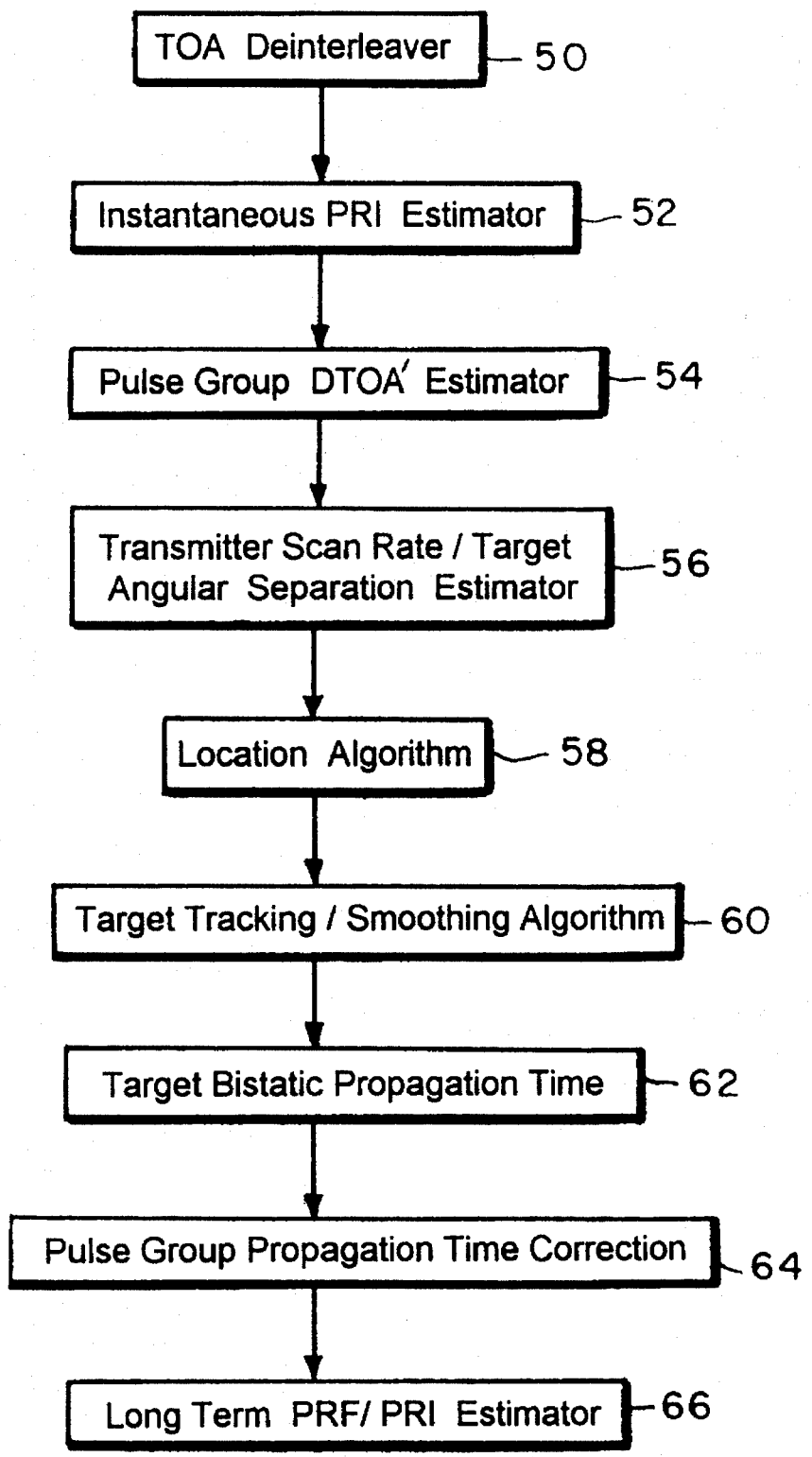
FIG. 3 is a flow chart of the functions of a processor according to one embodiment of the invention.

The functions of the processor 26 in a preferred embodiment are illustrated in flow chart form in FIG. 3 and include:

1. TOA Deinterleaver 50

This function is required whenever two or more transmitters exist in the environment so as to cause multiple responses from each target. By any of many techniques known in the art, a pulse deinterleave process can be implemented to discard pulses that do not reflect the PRI of the transmitter or transmitters of interest. Pulses judged to be responses to a transmitter of interest are passed to the next algorithm for additional processing.

2. Instantaneous PRI Estimator 52

This function is required whenever the PRI of any transmitter of interest is not known a priori. Groups of pulses corresponding to the PRI of each transmitter of interest are processed by a least mean square (LMS) PRI (or pulse repetition frequency (PRF)) estimation algorithm to produce instantaneous PRI (or PRF) estimates, based on single pulse group measurements. This estimate is performed for each pulse group associated with each target.

3. Pulse Group DTOA' Estimator 54

Pulse groups from one target are compared to pulse groups from a second target responding to the same transmitter and LMS pulse group time separation estimates are made using the appropriate known PRI or long term PRI estimate (discussed below). Once the pulse group estimates are made, the known PRIs or long term PRI estimates are used to extract the DTOA' that results from subtracting the integer number of pulse intervals from the pulse group estimate to produce a residue whose magnitude is less than half of the PRI. (If the residue exceeds half of the PRI, an ambiguity occurs that must be dealt with in more sophisticated tracking processes. In most cases of interest, however, it is likely that the residue will be less than half of the PRI and, therefore, the value will be unambiguous.)

4. Transmitter Scan Rate/Target Angular Separation Estimator 56

Estimation of the transmitter scan rate is required whenever the scan rate of any transmitter of interest is not known a priori. Successive receptions from the same target with the same PRI are compared to extract the time difference between each scan by each transmitter. All time differences associated with each target may be averaged in a leaky integrator (low pass filter) to extract a long term scan average. These time measurements are the scan periods of each transmitter and the inverses are the scan rates. For each PRI, the time between illuminations of successive targets (the same time difference used to calculate the total pulse group separation time) is divided by the scan period (or multiplied by the scan rate) and multiplied 360 degrees to calculate the angular separation between targets as seen by each transmitter.

5. Location Algorithm 58

The appropriate location algorithm is utilized in conjunction with startup data and the above measurements to estimate the location of the targets and/or transmitters. Derivations of location algorithms for representative cases appear below.

6. Target Tracking/Smoothing Algorithm 60

This algorithm is optional, but it does provide smoothed track data from individual raw location estimates and can improve the accuracy of subsequent processing estimates. In addition to providing smoothed position estimates, it also uses those position estimates to generate a transmitter antenna scan reference relative to north (required if the output will be used to drive a bistatic processor). Multiple north reference estimates are smoothed to provide the long term stable north reference required for optional bistatic processing.

7. Target Bistatic Propagation Time 62

This algorithm is optional, but must be implemented if a clock is to be generated (required if the output will be used to drive a bistatic processor) that is synchronous, in both frequency and phase, with each unseen transmitter signal. This algorithm takes the best estimate of current target position and calculates the distance from the transmitter to the transponder to the receiver. This distance is divided by the speed of light to calculate the bistatic propagation time appropriate at the instant of pulse group reception.

8. Pulse Group Propagation Time Correction 64

This algorithm is optional, but it must be implemented if a clock is to be generated (required if the output will be used to drive a bistatic processor) that is synchronous, in both frequency and phase, with each unseen transmitter signal. After each pulse group is received and processed, to locate the target, the propagation time is subtracted from the times of arrival of each pulse of the group. These pulses are noisy pulses in frequency and phase synchronism with the transmitter.

9. Long Term PRF/PRI Estimator 66

This algorithm is optional, but it must be implemented if a clock is to be generated (required if the output will be used to drive a bistatic processor) that is synchronous, in both frequency and phase, with each unseen transmitter signal. The noisy pulses from the "pulse group propagation time correction" algorithm are fed into a filter to produce smoothed, long term averaged PRI estimates. To initialize this algorithm at processor turn on, or after loss of synchronism due to some transient, the instantaneous PRI estimates are used to restart and are gradually replaced by the long term estimates. Implementation of this algorithm and generation of a long term PRF/PRI estimate and use of this value in conjunction with the DTOA' estimate 54 improves the accuracy of the DTOA' estimate and subsequent location estimate.

A prototype of one embodiment of the invention (involving two or more aircraft responding to two transmitters at known locations without direction finding capability) has been built to demonstrate its performance. Details of this embodiment will now be presented to illustrate the invention by way of example. The prototype was designed to use signals transmitted by aircraft in response to the air traffic control radar beacon system. This system, called the International Civil Aviation Organization (ICAO) Identification Friend-or-Foe (IFF), uses ground-based transmitter stations broadcasting at 1030 MHz. Each ground station transmits with an arbitrary PRI and antenna scan rate. Each aircraft is equipped with an on-board transponder which transmits a reply to the transmissions on a one-to-one basis (one reply for each received pulse) at 1090 MHz. The IFF system operates in several modes, but for simplicity the prototype was designed for the mode 3/A, the civilian identification mode. The reply to a transmission pulse in this mode is a pulse group of 20.3 μsec duration consisting of two framing bits, twelve code bits, and an "X" bit which is not currently used. The twelve code bits form a four-digit octal number that uniquely identifies the aircraft. The prototype includes a receiver, IFF decode/timer circuitry implemented in an IBM PC AT-compatible computer, and processing software.

Figure 4:
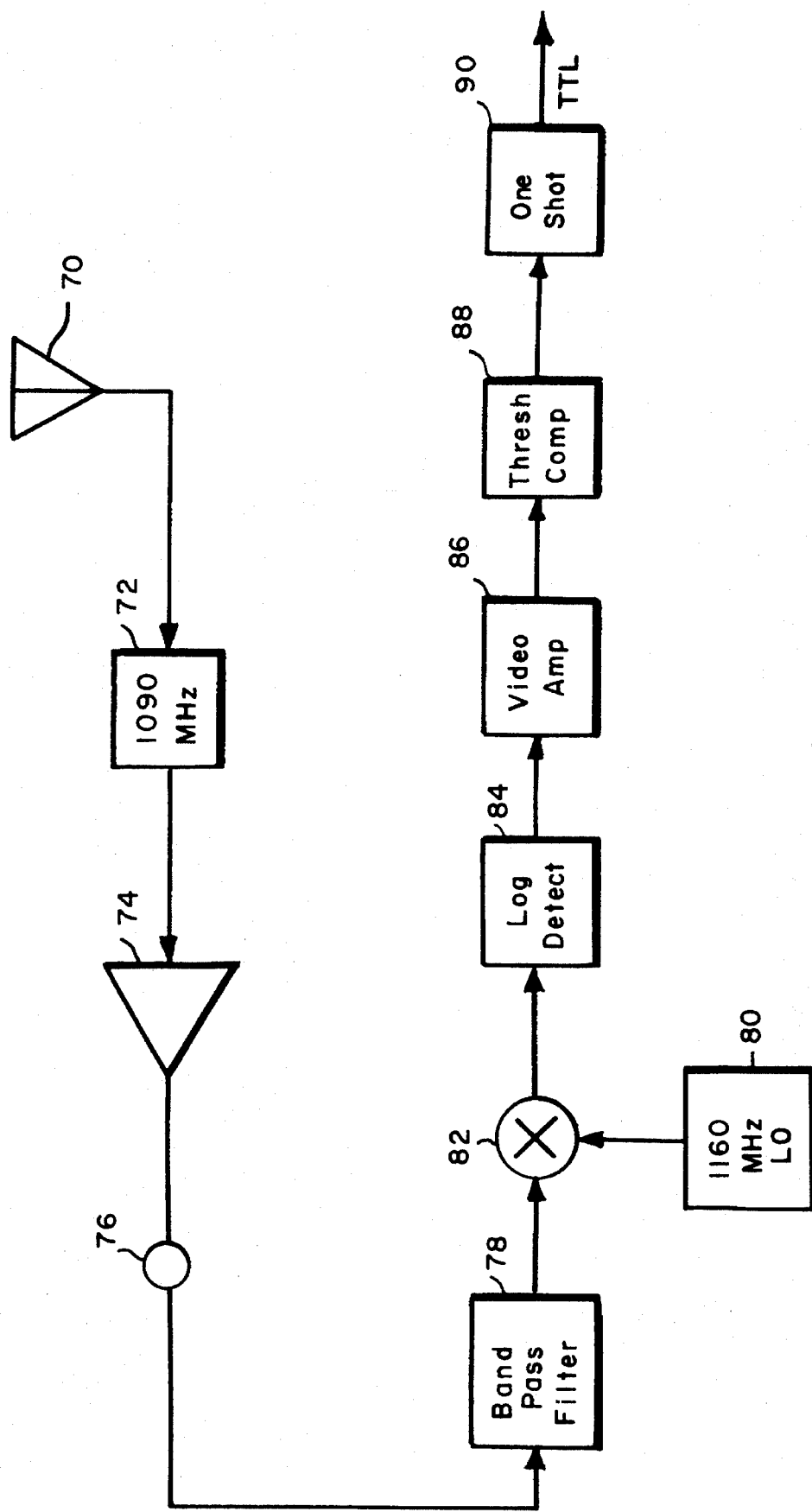
FIG. 4 is a block diagram of a receiver according to one embodiment of the invention.

A block diagram of the single conversion receiver of the prototype is shown in FIG. 4. For demonstration purposes, an antenna 70, a preselector 72 tuned to 1090 MHz, and a low noise amplifier 74 were installed on a roof and connected to the rest of the system via a low-loss coaxial cable 76 approximately 100 feet long. Two different antennas were used in the prototype: a commercial logarithmic antenna with a gain of approximately 7 dB, and a homemade monopole with a gain of approximately 4 dB.

In the prototype, the received 1090 MHz signal is applied to bandpass filter 78 and downconverted to 70 MHz by mixing it with a 1160 MHz signal 80 by means of mixer 82. The 70 MHz signal is applied to logarithmic amplifier/detector 84, and the resultant video signal is filtered and amplified by video amplifier 86. The signal is then applied to threshold comparator 88, which generates a TTL pulse when the threshold level is exceeded. This pulse triggers a monostable multivibrator ("one-shot") 90 which generates a 400 nsec pulse for application to the decode/timer circuitry. The comparator threshold level was set such that the line-of-sight range of the receiver was approximately 100 miles with the logarithmic antenna and approximately 150 miles with the monopole.

Figure 5:
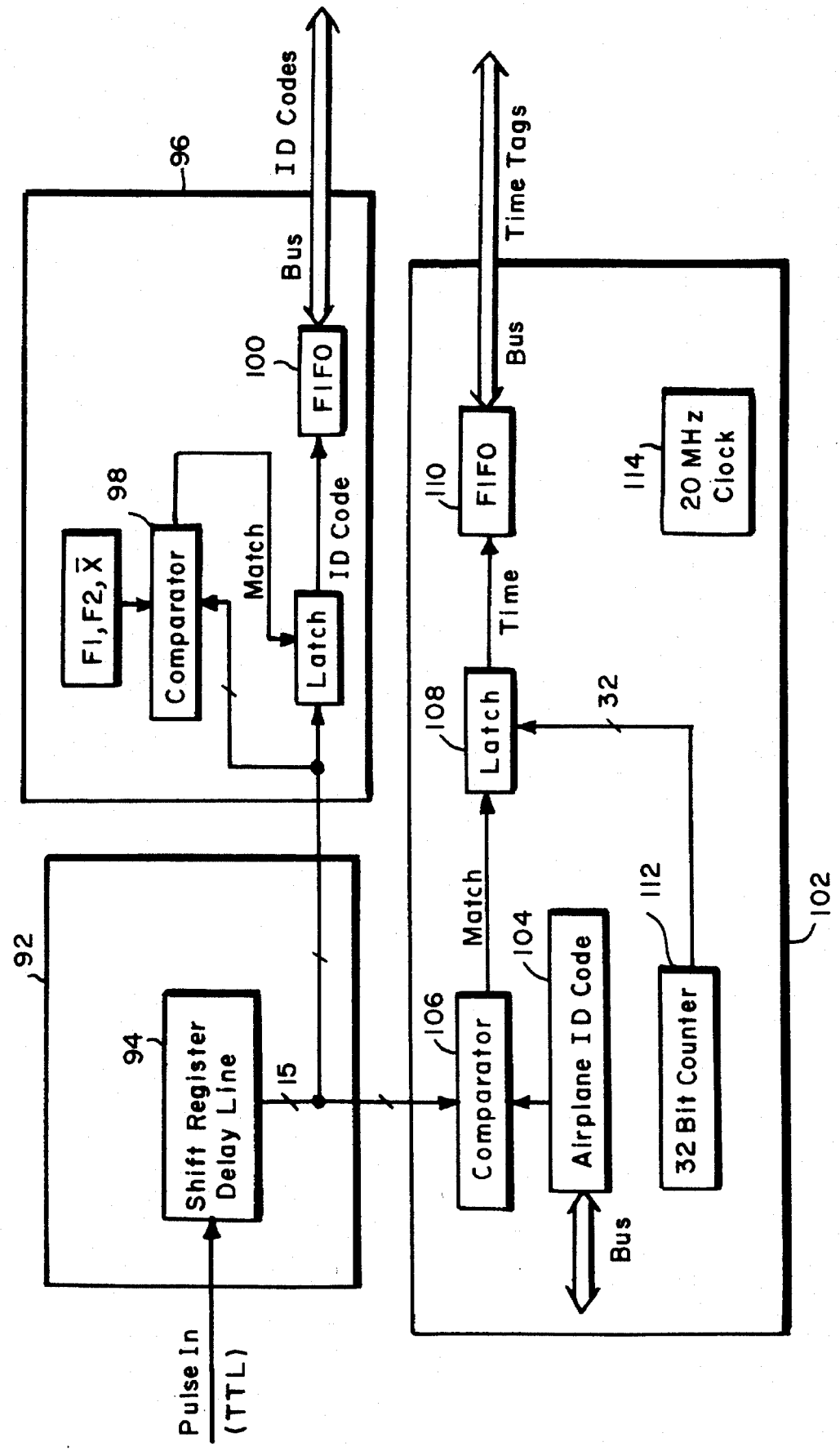
FIG. 5 is a block diagram of decode/timer circuitry according to one embodiment of the invention.

A block diagram of the decode/timer circuitry is shown in FIG. 5. This circuit identifies received IFF codes and establishes the time of arrival (TOA) of selected codes. The prototype was designed to process two aircraft codes simultaneously. The circuitry was implemented on three IBM PC AT bus-expansion prototype cards housed in the computer.

The Tapped Delay Line Board 92 accepts the TTL pulses from the receiver and provides, by means of shift register delay line 94, 15 sample bits at the positions corresponding to the center of each pulse of the IFF reply signal. These 15-bit words are provided to each of the remaining two cards. This delay line is actually a 512-bit shift register formed by a cascade of 64 8-bit shift registers being clocked at 20 MHz.

The Frame Recognizer Board 96 is used to determine for which aircraft reply codes the Decode/Timer Circuit should be programmed. It decodes and stores all codes received over a period of time (approximately 20 seconds). These codes are then read by the computer and displayed as a histogram for operator information. The Frame Recognizer Board 96 operates by comparing the incoming 15-bit word with the framing bits and the X bit by means of comparator 98. A match is declared when the framing bits are present and the X bit is absent. Upon a match, the remaining 12 code bits are stored in first-in first-out (FIFO) memory 100.

The Time Tag Board 102 is a two-channel board which decodes the desired IFF signals, generates a time tag representing the TOA for each decoded signal, stores the time tags, and provides an interface to the computer to retrieve the time tags. Two software-programmable registers 104 store the IFF reply codes for the two aircraft the system is tracking. The 15-bit word from the Tapped Delay Line Board 92 is compared to the codes in registers 104 by means of comparator 106. When a match is detected, the time is latched by means of latch 108 and stored in 1K-byte FIFO 110. The resulting time tag is a 32-bit word generated by 8 cascaded 4-bit counters 112 driven by 20 MHz clock 114. Time increments are therefore 50 nsec, and the unambiguous time period is approximately 3.5 minutes.

Processing software in the computer monitors the status of FIFO's 100 and 110 and reads the data into files when the FIFO's become half full. The timing and identification data is then subsequently processed using the location algorithms to generate aircraft location estimates.

As described above, targets and transmitters are located by solving equations of n equations in n (generally) unknowns. There are a variety of ways that such systems of equations can be solved using a computer. The most elegant methods involve solving the equations mathematically to derive a closed-form solution which is programmed in a location algorithm in the computer.

Figure 6:
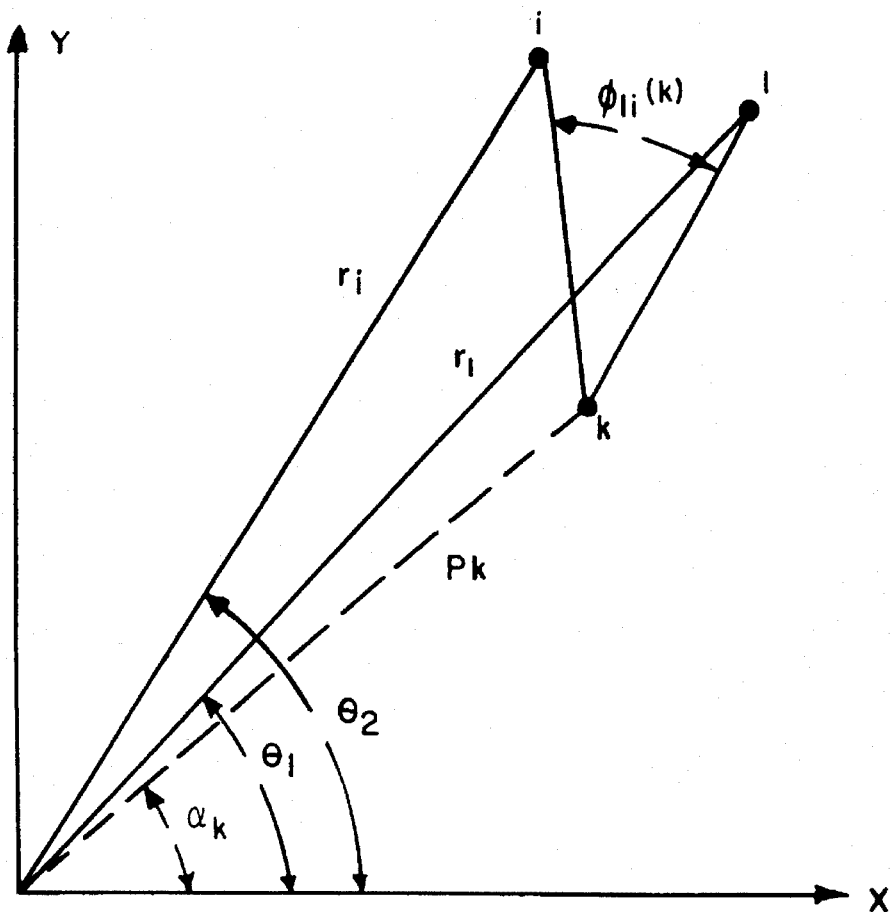
FIG. 6 is a depiction of the generalized geometry of the problem for an arbitrary number of targets and transmitters illustrating the parameters used in the analysis.

A general form of equations can be generated for K transmitters and I targets, where K and I are arbitrary. A generalized geometry of the problem is shown in FIG. 6. In FIG. 6, $Y_1$ and $Y_i$ are the distances from the receiver site to the first and ith targets, $\theta_1$ and $\theta_i$ are the lines of bearing from the receiver site to the first and ith targets, $\rho_k$ and $\alpha_k$ are the distance and line of bearing respectively from the receiver site to the kth transmitter, and $\phi_{1i(k)}$ is the angle between the first and ith target as measured at the kth transmitter.

The location vectors can be written more compactly in polar notation:

$$R_i = Y_i e^{j\theta_i}$$

$$P_k = \rho_k e^{j\alpha_k}$$

The differential distance $D_{1i(k)}$ between target sites 1 and i from transmitter site k to the receiver site (origin) can be written using this notation:

$$D_{1i(k)} = \{|R_i| + |R_i - P_k|\} - \{|R_1| + |R_1 - P_k|\}$$

The differential angle $\phi_{1i(k)}$ between target sites 1 and i as seen from transmitter site k can also be written using this notation:

$$e^{j\phi_{1i(k)}} = \frac{(R_i - P_k)(R_1 - P_k)^*}{|R_i - P_k||R_1 - P_k|}$$

where $(\cdot)^*$ denotes the complex conjugate operator.

These last two equations are completely general and form a set of two equations that can be used to derive all of the equations necessary to implement any of the embodiments of the invention by letting i run from 2 to I, the number of targets, an letting k run from 1 to K, the number of transmitters. The number of equations generated will be $2(I-1)K$. Under a fairly wide range of parameters, these $2(I-1)K$ equations can be used to determine a like number of unknowns.

It is useful to generate forms of these equations involving only real numbers. By recognizing that the magnitudes of $R_i$ and $R_1$ are $Y_i$ and $Y_1$ respectively, the expression for $D_{1i(k)}$ can be rewritten as $$(D_{1i(k)} - Y_i + Y_1) = |R_i - P_k| - |R_1 - P_k|$$

It is clear from FIG. 6 that shifting the vector difference $(R_1 - P_k)$ by an amount $\phi_{1i(k)}$ allows the right side of this expression to be included in a single magnitude operator:

$$(D_{1i(k)} - Y_i + Y_1) = \pm|(R_i - P_k) - (R_1 - P_k)e^{j\phi_{1i(k)}}|$$

The square of the left side of this expression equals the magnitude squared of the right side. Therefore, $$(D_{1i(k)} - Y_i + Y_1)^2 = |(R_i - P_k) - (R_1 - P_k)e^{j\phi_{1i(k)}}|^2$$

From this equation and FIG. 6, it is possible to solve for $Y_1$ in terms of the other elements of the equation:

$$r_1 = \frac{D_{1i}^2(k) - 4\rho_k^2 \sin^2\left(\frac{\phi_{1i}(k)}{2}\right) - 2r_i\left[D_{1i}(k) + 2\rho_k \sin\left(\theta_i - \alpha_k - \frac{\phi_{1i}(k)}{2}\right)\sin\frac{\phi_{1i}(k)}{2}\right]}{4r_i \sin^2\left(\frac{\theta_i - \theta_1 - \phi_{1i}(k)}{2}\right) - 2\left[D_{1i}(k) + 2\rho_k \sin\left(\theta_1 - \alpha_k + \frac{\phi_{1i}(k)}{2}\right)\sin\frac{\phi_{1i}(k)}{2}\right]}$$

The expression above for $e^{j\phi_{1i(k)}}$ can be rewritten by cross-multiplication:

$$|R_i - P_k||R_1 - P_k| = (R_i - P_k)(R_1 - P_k)^* e^{-j\phi_{1i}(k)}$$

This expression can be simplified by recognizing that the imaginary part of the right side of the equation must be zero. This leads directly to another expression for $r_1$:

$$r_1 = \frac{\rho_k^2 \sin(\theta_{1i}(k)) + r_i \rho_k \sin(\theta_i - \alpha_k - \phi_{1i}(k))}{r_i \sin(\theta_i - \theta_1 - \theta_{1i}(k)) - \rho_k \sin(\alpha_k - \theta_{1i}(k))}$$

By incrementing i from 2 to I and k from 1 to K, the two expressions for $r_1$ can be used to derive location algorithms for all of the embodiments of the processor. For example, for the two-target/one transmitter problem, the two expressions for $r_1$ can be equated, and a single quadratic equation can be solved directly for $r_2$ which can then be inserted into either of the expressions to solve for $r_1$.

Derivations carried out by Joseph L. Leva resulting in closed form solutions for the two target/one transmitter problem and the four target/one transmitter problem will be presented to illustrate by way of example the methods and capabilities of the invention. An iterative solution derived by William Nelson for the two target/two transmitter problem will also be presented. The following analyses illustrate one approach to each problem. Many alternative approaches resulting in the same solution exist. In general, all of the equations formed using the two above expressions for $r_i$ for various values of I and K will succumb to straightforward iterative techniques if a closed form solution is not directly available.

Two Target/One Transmitter Problem

Figure 7A:
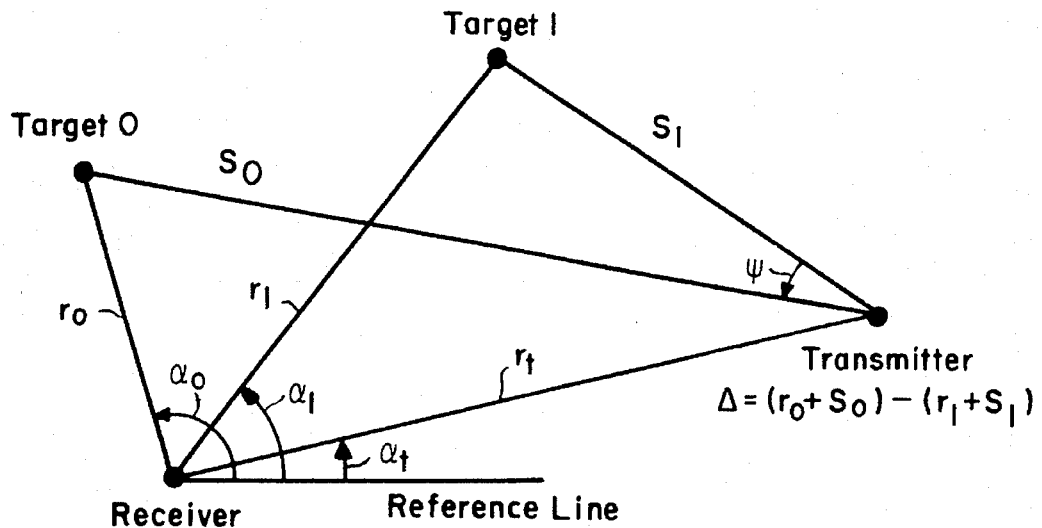
FIGS. 7a and 7b are depictions of the two target/one transmitter problem illustrating the parameters used in the analysis.

FIG. 7a illustrates the basic two-target geometry. The radar system elements and the targets are assumed to lie in the horizontal plane. The range-angle pair representing the transmitter location is given by $(r_t, \alpha_t)$ in a polar coordinate system centered at the receiver equipment. The coordinate pairs representing the target locations are $(r_m, \alpha_m)$ for m=0,1. The azimuth angle $\alpha_m$ is defined as the counterclockwise angle measured from a reference line to the target direction, and the range $r_m$ is the target distance from the receiver. The angle between the targets as viewed from the transmitter location is denoted by $\Psi$. This parameter is defined as the counterclockwise angle from the direction of target 1 to the direction of target 0. The bistatic range sum for each target is given as $r_m + s_m$ where $s_m$ represents the corresponding target range from the transmitter. The range sum difference $\Delta$ is defined by the formula $\Delta = (r_0 + s_0) - (r_1 + s_1)$ and represents the difference in range sum between target 0 and target 1.

In the two-target problem, it is assumed that the radar signal processing results in measurements of $\alpha_0$, $\alpha_1$, $\Psi$ and $\Delta$. This information is combined with the transmitter and receiver position information to locate the targets. In particular, the values for $\alpha_0$, $\alpha_1$, $\Psi$, $\Delta$, $r_t$ and $\alpha_t$ are used to determine the target range variables $r_0$ and $r_1$.

The first step in obtaining a solution is to determine functional relationships between the measured and desired variables. This will be done through the introduction of auxiliary variables $\beta$, $\gamma$ and u for each target and the application of standard trigonometric relations.

Figure 7B:
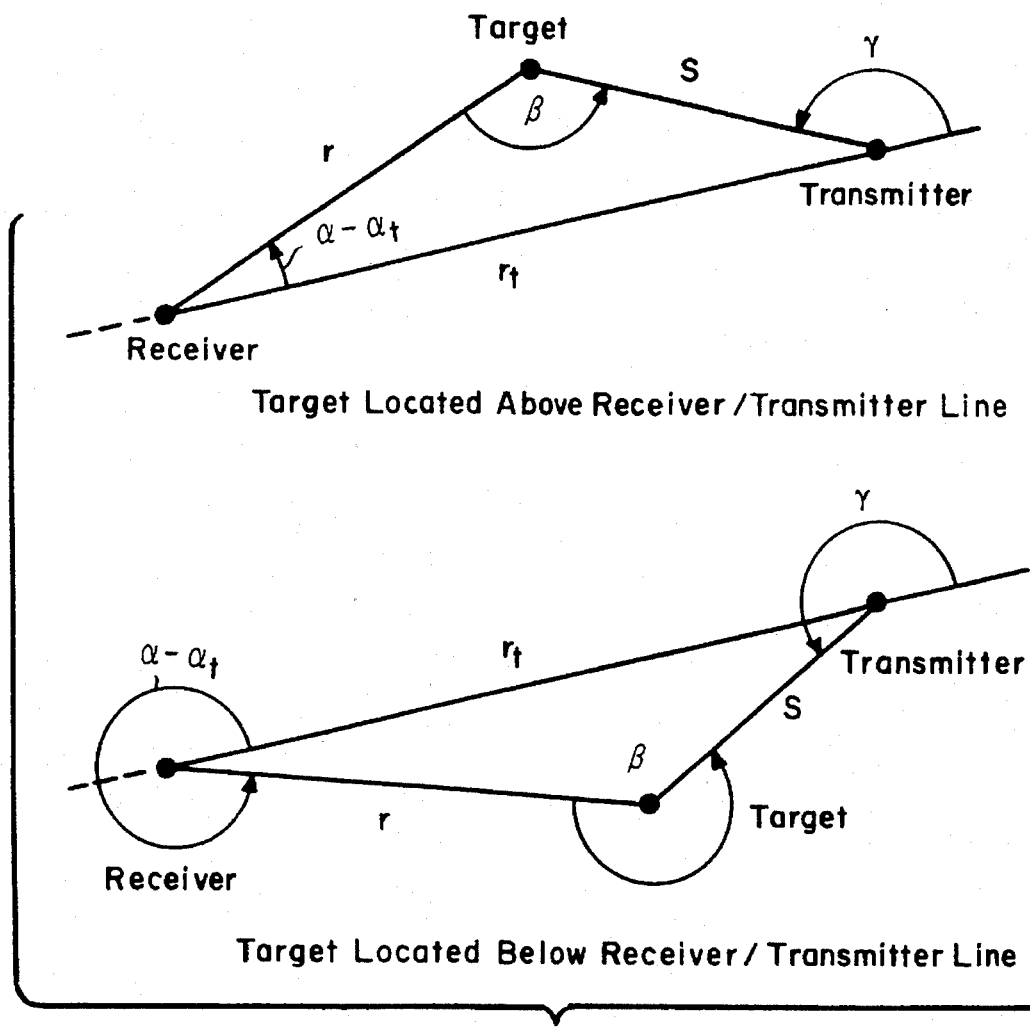

As a visual aid, FIG. 7b illustrates several orientations of a single target with respect to the transmitter and receiver location. In the upper and lower parts of the figure, the target is shown respectively above and below the line connecting the transmitter and receiver positions. The reference line used to define the angles at the receiver and the subscripts which specify the target number have been omitted. The angle $\beta$ is defined as the counterclockwise angle between the receiver and transmitter location as viewed from the target position. The angle is measured from the direction of the receiver to the direction of the transmitter. Thus, for a target in the upper half-plane, $\beta$ lies in the range $0 < \beta < \pi$, while for a target in the lower half-plane, $\pi < \beta < 2\pi$. Similarly, $\gamma$ is defined as the angle between the extended line generated by the receiver and transmitter location and the direction of the target as viewed from the transmitter location. The variable u is defined as the range sum associated with the target location, $u = r + s$.

Using the fact that the interior angles of a triangle sum to $\pi$, one obtains from the figure the following relationship, $$\gamma = \beta + (\alpha - \alpha_t) \mod 2\pi, \tag{1}$$

valid for any positioning of the target relative to the transmitter and receiver. The evaluation mod2π is required when the angles involved are greater than π. Note that the formula is also valid for target positions along the extended line connecting the transmitter and receiver (provided only that the target position does not concide with the transmitter or receiver location). For example, if the target is between the transmitter and receiver, $\beta=\pi, \alpha-\alpha_t=0$ or $2\pi, \gamma=\pi$ and the formula is correct mod2π. Applying the law of sines to the same triangles, one obtains $$\frac{s}{\sin(\alpha-\alpha_t)} = \frac{r}{\sin\gamma} = \frac{r_t}{\sin\beta} \quad (2)$$

relating the lengths of the sides to the various angles. This formula is valid for all target geometries provided the target is located off the extended line connecting the transmitter and receiver; the terms in the formula are either all positive or all negative depending on whether the arguments to the sine function are in the range 0 to π mod2π or π to 2π mod2π.

The formulas in (2) can be separated and solved for s and r in terms of the other variables. After substituting for γ using (1), one obtains $$r_m = \frac{r_t \sin(\beta_m + \alpha_m - \alpha_t)}{\sin\beta_m} \quad s_m = \frac{r_t \sin(\alpha_m - \alpha_t)}{\sin\beta_m} \quad (3)$$

where the index m has been added to the variables β and α to reference the target number, m=0,1. These equations express the range of the targets from the transmitter and receiver in terms of the measured and known parameters $\alpha_m$, $\alpha_t$ and $r_t$ and in terms of the auxiliary variables $\beta_m$. A further inspection of FIG. 7b indicates an additional geometric relationship limiting the range of $\beta_m$ as a function of $\alpha_m$ and $\alpha_t$.

If $0 < \alpha_m - \alpha_t < \pi$, then $$0 < \beta_m < \pi - (\alpha_m - \alpha_t)$$

If $\pi < \alpha_m - \alpha_t < 2\pi$, then $$3\pi - (\alpha_m - \alpha_t) < \beta_m < 2\pi \quad (4)$$

These relationships are obtained by observing that the target β angle changes monotonically as the target position moves out a ray originating at the receiver, and by considering the limiting cases near each end of the ray. These conditions are sufficient to guarantee there is a physical geometry for given values of $\beta_m$ and $\alpha_m - \alpha_t$.

The formulas in (3) can be combined to obtain expressions for the range sum $u_m = r_m + s_m$ for m=0,1. Substituting these into the defining relation $\Delta = u_0 - u_1$, one obtains the following equation involving the measured parameter Δ.

$$\Delta = \frac{r_t[\sin(\beta_0+\alpha_0-\alpha_t)+\sin(\alpha_0-\alpha_t)]}{\sin\beta_0} - \frac{r_t[\sin(\beta_1+\alpha_1-\alpha_t)+\sin(\alpha_1-\alpha_t)]}{\sin\beta_1} \quad (5)$$

Similarly, applying (1) to both targets and subtracting, one obtains an expression for the angle Ψ which is defined by the formula $\Psi = \gamma_0 - \gamma_1$.

$$\Psi = \beta_0 - \beta_1 - \alpha_0 - \alpha_1 \mod 2\pi \quad (6)$$

Equations (5) and (6) relate the measured and system geometry parameters [$\alpha_0, \alpha_1, \Delta, \Psi, r_t, \alpha_t$] to the auxiliary variables $\beta_0$ and $\beta_1$. In principle, these equations can be solved for $\beta_0$ and $\beta_1$ and the values obtained used with (3) to obtain solutions for the target range parameters. Any $\beta_0$, $\beta_1$ pair that satisfies (5) and (6), and in addition satisfies the constraints (4), must correspond to a physical target geometry that solves the two-target problem.

Equations (5) and (6) are difficult to solve directly because of the presence of the trigonometric functions. These equations, however, can be transformed into a pair of rational functions by a change of variables using complex exponentials. The basic idea is to expand the trigonometric functions using the identity $\sin x = (e^{ix} - e^{-ix})/2i$ and then substitute for the exponentials complex analogs for the relevant variables in the problem.

The equations in (3) will be dealt with first. Define complex parameters $Y_m$, $B_m$, and R by the formulas $$Y_m = e^{i\beta_m} B_m = e^{i\alpha_m} R = Y_t e^{i\alpha_t}. \quad (7)$$

$Y_m$ and $B_m$ (m=0,1) are the complex analogs for the angular parameters $\beta_m$ and $\alpha_m$. Both $Y_m$ and $B_m$ have unit modulus; i.e., they are constrained to lie on the unit circle, since $\beta_m$ and $\alpha_m$ are real. A useful consequence of this is that their reciprocal equals their conjugate, a fact that is used in the algebraic manipulations to follow. R is a complex parameter that represents the position of the transmitter relative to the receiver. In terms of these variables, the numerator and denominator of the expressions in (3) take the form $$\sin\beta_m = \frac{Y_m - Y_m^*}{2i} \quad (8)$$

$$r_t \sin(\beta_m + \alpha_m - \alpha_t) = \frac{Y_m B_m R^* - Y_m^* B_m^* R}{2i}$$

$$r_t \sin(\alpha_m - \alpha_t) = \frac{B_m R^* - B_m^* R}{2i}$$

The asterisk on the various parameters indicates complex conjugation. Combining these expressions, one is led to the following expressions for $r_m$ and $s_m$ in terms of the complex variables.

$$r_m = \frac{Y_m B_m R^* - Y_m^* B_m^* R}{Y_m - Y_m^*} = \frac{Im(Y_m B_m R^*)}{Im(Y_m)} \quad (9)$$

$$s_m = \frac{T_m R^* - B_m^* R}{Y_m - Y_m^*} = \frac{Im(B_m R^*)}{Im(Y_m)}$$

The functional notation Im() refers to the imaginary part function which returns the imaginary part of its complex argument. Use of these formulas requires that Im $(Y_m) \neq 0$ which is tantamount to requiring that $Y_m \neq \pm 1$ or that $\beta_m \neq 0$ or π. These omitted geometries correspond to the target lying along the extended line passing through the receiver and transmitter locations. Thus, provided a target does not lie on this line and assuming its complex parameter $Y_m$ can be determined, these formulas can be used to compute the target range parameters.

A formula for the range sum can be obtained by adding the center expressions for $r_m$ and $s_m$ in (9). The sum can be simplified by combining the fractions, multiplying numerator and denominator by $Y_m$ to eliminate the conjugation, and finally by factoring and eliminating a common factor ($Y_m + 1$). The following expression results.

$$u_m = r_m + s_m = \frac{Y_m B_m R^* - B_m^* R}{Y_m - 1} \quad (10)$$

For fixed values for R and $B_m$, and provided $B_m R^* \neq B_m^* R$, this formula expresses $u_m$ as a linear fractional transformation of the auxiliary variable $Y_m$. The transformation maps the unit circle onto the extended real line. The indicated condition is satisfied provided the target lies off the line generated by the transmitter and receiver location and the formula works for all such target locations. In addition, it correctly computes the range sum for a target located between the transmitter and receiver as well. For any such geometry, $\beta_m = \pi$, $Y_m = -1$, and $\alpha_m - \alpha_r = 0$. Evaluating the formula, one obtains $$u_m = \frac{B_m R^* + B_m^* R}{2} = \frac{r_t(e^{-i(\alpha_m - \alpha_t)})}{2} = r_t \cos(\alpha_m - \alpha_t) = r_t \quad (11)$$

which is the correct answer for this situation. The formula is indeterminate for target locations along the exterior rays determined by the transmitter/receiver line.

A formula for the range sum difference is obtained by evaluating the formula $\Delta = u_0 - u_1$ using (10). First, however, the following simplifications in notation will be made. The symbols $Y_0, Y_1, B_0$ and $B_1$ will be replaced by X, Y, A, and B, respectively. For convenient reference, the definitions of these new parameters are $$X = e^{i\beta_0} Y = E^{i\beta_1} A = e^{i\alpha_0} B = e^{i\alpha_1} \quad (12)$$

In terms of these variables, a formula for the range sum difference, which is the complex analog to (5), is given as follows:

$$\Delta = \frac{XAR^* - A^*R}{X-1} - \frac{YBR^* - B^*R}{Y-1} \quad (13)$$

Define complex parameters C and K by the formulas $$C = e^{i\Psi} K = A^* BC. \quad (14)$$

These parameters each have modulus 1 and are determined by the angular data $\alpha_0, \alpha_1$, and $\Psi$. The complex analog to (6) is obtained by multiplying both sides of it by i and exponentiating. After some manipulation, the following formula is obtained.

$$Y = K^* X \quad (15)$$

Equations (13) and (15) are the complex analogs to (5) and (6). The parameters A, B, K, and R are expressed in terms of available information through equations (7), (12), and (14). Hence, these equations involve just two unknowns, X and Y, which are the complex representation for the target $\beta$ angles. Equation (15) is linear in X and Y; equation (13) expresses a linear fractional relationship between these variables. Simultaneous solution for X and Y is straightforward and is presented in the following subsection. Substitution of the results into (9) leads to the target range parameters $r_m$ and $s_m$.

In summary, it has been shown that given any physical geometry with measurement data $[\alpha_0, \alpha_1, \Delta, \Psi, r_t, \alpha_r]$, provided that neither target lies on the exterior rays determined by the transmitter and receiver location, the associated complex parameters [A, B, K, R, X, Y] must satisfy (13) and (15). In addition, each target range is given by (9) provided the target is not in line with the radar system elements. Conversely, any solution of (13) and (15) corresponds to an actual physical solution to the two-target problem provided the associated $\beta$ values are real (i.e., X has unit modulus), neither X nor Y are real, and the geometric constraints in (4) are met.

It can be shown that the conditions in (4) are met if and only if the parameters $r_m$ and $s_m$ (m=0,1) are each positive when computed by (9). Hence, when determining the validity of a possible solution, the constraints can be verified in the course of determining $r_m$ and $s_m$, and the target $\beta$ angles need not be explicity calculated.

The two-target problem has been reduced to solving equations (13) and (15) simultaneously for X and Y. Equation (15) is linear in the unknowns, while (13) expresses a linear fractional relationship between the variables. By substituting (15) into (13) to eliminate Y, after rearrangement of the terms, one is led to the following equation.

$$\Delta(X-1)(X-K) = (XAR^* - A^*R)(X-K) - (XBR^* - B^*KR)(X-1) \quad (16)$$

The previous development implies that this equation must be satisfied by the complex variables associated with a physical geometry provided the targets are both located off the exterior rays defined by the radar system elements. However, this equation does not need this restriction and is satisfied for any target geometry (provided only that the targets are not at the radar system positions). If a target is located along an exterior ray, the target $\beta$ angle is 0 and either X=1 or X=K, depending on whether target 0 or 1 is involved (in the second case, Y=1 and X=K follows from (15)). If target 0 is on an exterior ray, AR* must be real, and substitution of 1 for X in (16) give equality. Similarly, in the target 1 case BR* is real, and the equation is satisfied with X=K. Thus, equations (15) and (16) can be used to generate all (X,Y) pairs that could solve the two-target problem for a given data set.

By rearranging and collecting terms and making substitutions for K using (14), equation (16) can be put into the following equivalent form.

$$[(A-B)R^* - \Delta]X^2 + [(1-C)(R^*B - RA^*) + (1+K)\Delta]X + [KR(A^* - B^*) - K\Delta] = 0 \quad (17)$$

If the reference line for measuring angles at the receiver is chosen so that $\alpha_r = 0$ (a condition readily accomplished and assumed for the remainder of the section), a further simplification can be made. In this case, $R = r_t$ and it is convenient to define a normalized variable $\tilde{\Delta}$ by the formula $$\tilde{\Delta} = \Delta / r_t. \quad (18)$$

The final form of equation (16) is $$[A-B-\tilde{\Delta}]X^2 + [(1-C)(B-A^*) + (1+K)\tilde{\Delta}]X + [K(A^* - B^* - \tilde{\Delta})] = 0, \quad (19)$$

a quadratic equation in the unknown X. The coefficients can be evaluated from the data $[\alpha_0, \alpha_1, \Delta, \Psi, r_t, \alpha_r]$ using (12), (14) and (18). Provided the leading coefficient is not zero, the solution of the quadratic results in two possible values for X, denoted $x_1$ and $x_2$. Each value when substituted into (15) yields a corresponding value for Y, $y_1$ and $y_2$. In this way, two X, Y pairs $(x_1, y_1)$ and $(x_2, y_2)$ are obtained which are the possible complex $\beta$ parameter pairing for the targets for the given data set.

Provided these parameters have modulus 1 and are not real, equation (9) can be used to determine the target range parameters $r_m$ and $s_m$ associated with each X, Y pair. If the computed range parameters are all positive, the target positions are a solution to the two-target problem. Aside from degenerate and special cases to be dealt with presently, this solution technique completely solves the two-target problem. In general, there are either two, one, zero or, in degenerate cases, an infinite number of solutions to the two-target problem for a given data set.

The modulus of the X and Y values must be unity for the pair to correspond to a real physical geometry. In general, the computed parameters satisfy $|x_1| = |y_1|$ and $|x_2| = |y_2|$ since $|K| = 1$. Furthermore, since the product of the roots of a quadratic equals the ratio of the constant and quadratic coefficients $$|x_1| \cdot |x_2| = \left| \frac{K(A^* - B^* - \tilde{\Delta})}{A - B - \tilde{\Delta}} \right| = 1 \quad (20)$$

where the final simplification follows since the terms in parentheses and in the denominator are conjugates. Hence, either all four parameters lie on the unit circle or none of them do. In the latter case, no physical geometry solves the two-target problem and the given data set is inconsistent. (Data sets which are inconsistent in this sense do exist. An example is given by $\alpha_0=30°$, $\alpha_1=45°$, $\Psi=45°$, $\Delta=25$, $r_t=25$, $\alpha_t=0°$.)

If a target is located between the transmitter and receiver, its complex $\beta$ angle will be $-1$. The formulations leading to equations (15) and (16) incorporate this case as a removable singularity (see the discussion surrounding equation (11)). Although there is no problem in determining a target's $\beta$ angle if it is in this position, the range parameters cannot be determined. The range sum u and the angles $\alpha$ and $\gamma$ associated with a target position remain constant as the position is moved anywhere along the segment between the transmitter and receiver ($u=r_t$, $\alpha=0$, $\gamma=\pi$). Thus, in a physical geometry with a target in this position, the measured parameters remain unaltered for any other positioning of the target along this segment and the exact position of the target cannot be found. However, this does not preclude the accurate location of the other target if it is located off the segment. If while solving (19) and (15), an X, Y pair is obtained with say $X=-1$ and $\text{Im}(Y) \neq 0$, the range parameters for the second target can be obtained using (9). The solution should be accepted as valid if the range parameters are positive and if the $\alpha$ angle associated with X is zero (equivalently, A=1).

It can be shown that if $X=Y=1$, an infinite number of geometries generally satisfy the given data set. However, in situations where just one of the parameters X or Y are unity, there is usually just one solution which can be determined.

The one remaining case to consider is the possibility that the leading coefficient of the quadratic in (19) is zero. If this occurs, the constant term will vanish also and one if left with just the linear term. However, the complex variables associated with any physical geometry must necessarily satisfy the equation with the condition $|X|=1$. One concludes that if the leading coefficient vanishes, either the data set is inconsistent or all three of the coefficients must vanish together. In the latter case, the equation provides no information concerning X and the solution method fails.

To determine the geometries for which this happens, one can set the coefficients of the quadratic and linear terms to zero and attempt to solve:

$$A - B - \tilde{\Delta} = 0 \quad (21)$$

$$(1-C)(B-A^*) + (1+K)\Delta = 0 \quad (22)$$

Eliminating $\Delta$ from (22) using (21), after simplification, one is led to the condition $$K(B^* - B) + A - A^* = 0. \quad (23)$$

Conjugating (21), and using the fact that $\Delta$ is real leads to the relationship $B^* - B = A^* - A$ which after substitution into (23) leads finally to $$(A^* - A)(K - 1) = 0. \quad (24)$$

Hence, if the targets are located off the extended line between the transmitter and receiver, K must equal one, and the target $\beta$ angles must be equal. Expanding the real and imaginary parts of (21), one obtains the additional relations $$\cos\alpha_0 - \cos\alpha_1 = \Delta \sin\alpha_0 = \sin\alpha_1. \quad (25)$$

The second of these constraints implies that either $\alpha_0$ and $\alpha_1$ are equal, or that $\alpha_0 + \alpha_1 = \pi \mod 2\pi$. If $\alpha_0 = \alpha_1$ and $\beta_0 = \beta_1$, the target locations must coincide. This situation is readily seen to make the coefficients of the quadratic vanish. A second less obvious solution is if the $\alpha$ angles are complementary with respect to $\pi$, and the $\beta$ angles are equal.

Consider any such geometry. Exponentiating the condition $\alpha_0 + \alpha_1 = \pi$ results in the relation $AH = -1$ which, in turn, implies that $B^* = -A$ and $A^* = -B$ since A and B have modulus 1. Since the $\beta$ angles are equal, X=Y, and computing from (13), one verifies equation (21).

$$\tilde{\Delta} = \frac{XA - A^*}{X - 1} - \frac{YB - B^*}{Y - 1} = \quad (26)$$

$$\frac{X(A-B) - (A^* - B^*)}{X - 1} = A - B$$

Hence, the coefficients of the quadratic do indeed vanish for any such geometry. Equation (26) also shows that the normalized range sum difference is independent of $\beta$ and depends only on the values of $\alpha_0$ and $\alpha_1$. Similarly, equation (6) reduces to $\Psi = \alpha_0 - \alpha_1$ independent of $\beta$. Thus, for any geometry with $\alpha_0 + \alpha_1 = \pi$, the values for $\Delta$ and $\Psi$ are constant independant of the target locations provided only that the $\beta$ angles are equal. These geometries represent a fundamental degeneracy for the two-target problem in that an infinite number of target positions generate the same data values. One should expect that if the targets have nearly complementary $\alpha$ angles and the data nearly satisfies the equation $\Psi = \alpha_0 - \alpha_1$ (the condition that $\beta_0 = \beta_1$), the computed location of the targets will be sensitive to small errors in the measured data.

Four Target/One Transmitter Problem

The four-target ranging problem is an extension of the two-target problem; it uses angular and bistatic timing information on four targets to derive their locations. It differs from the two-target case in that required knowledge of the relative position of the transmitter and receiver is derived from the measured target information, thus reducing the need for a separate accurate navigation subsystem. (This is important in the case of moving radar platforms.) As in the two-target problem, the radar system processing is assumed to result in the aximuth angle of the targets relative to the receiver, bistatic timing information which yields the difference in range sum between pairs of targets, and the relative aximuth angle between pairs of targets as viewed from the transmitter.

Figure 8:
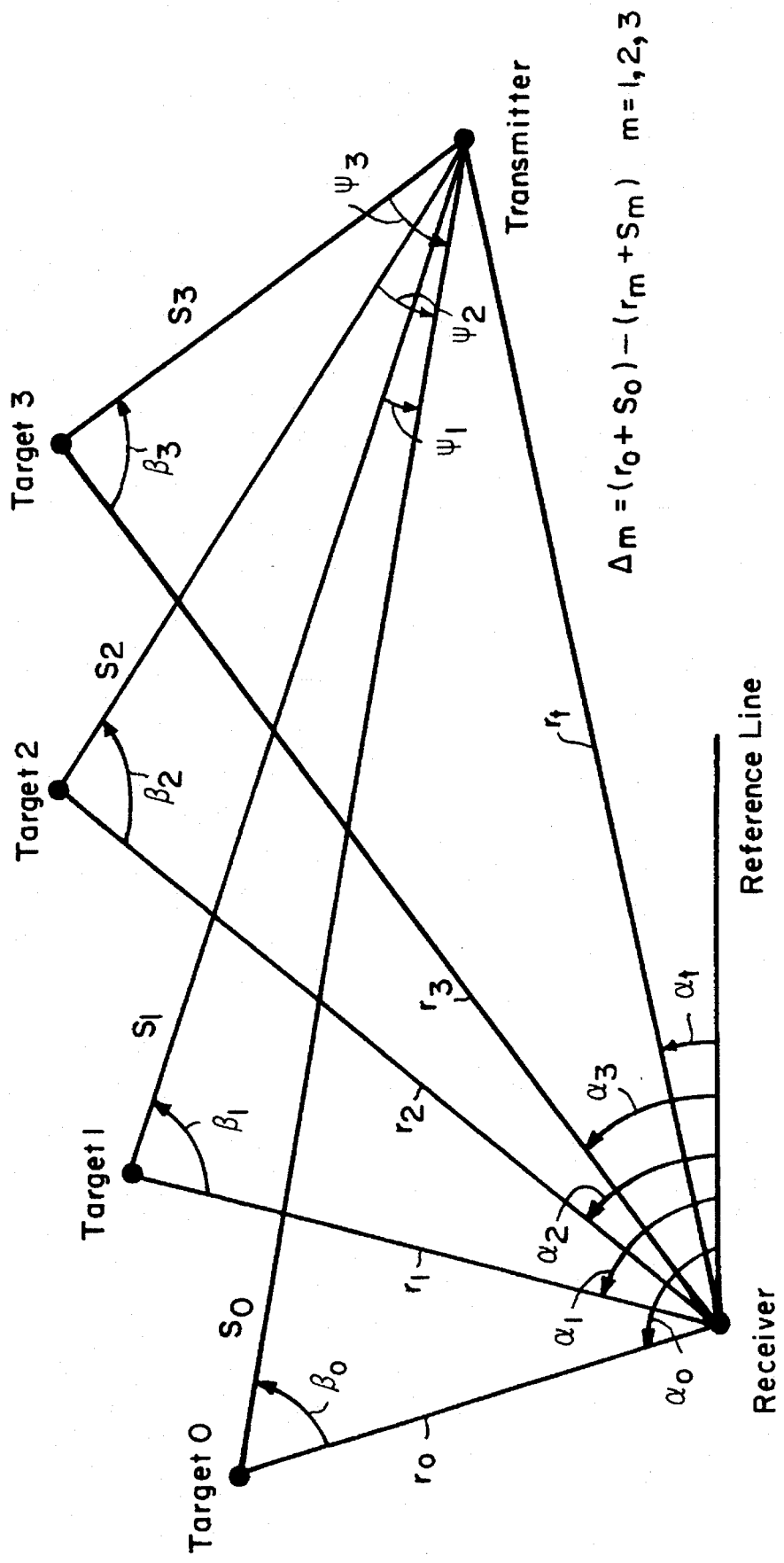
FIG. 8 is a depiction of the four target/one transmitter problem illustrating the parameters used in the analysis.

FIG. 8 illustrates the problem geometry. The range-angle pair representing the transmitter location relative to the receiver is denoted as before as ($r_t$, $\alpha_t$). Similarly, the coordinate pairs representing the target locations are ($r_m$, $\alpha_m$) for m=0, . . . , 3, where $r_m$ is the range of the mth target from the receiver and $\alpha_m$ measured the counterclockwise angle of the target from a reference line. The relative azimuth angles as viewed from the transmitter are denoted by $\Psi_m$ for m=1,2,3. Each angle is defined as the counterclock-wise angle from the direction of the mth target (m=1, 2,3) to the direction of target 0. The bistatic range sum for each target is given as $r_m + s_m$, where $s_m$ represents the corresponding target range from the transmitter. The range sum differences $\Delta_m$ are defined by the formula $\Delta_m=(r_0+s_0)-(r_m+s_m)$ for $m=1,2,3$ and represent the differences in range sum between target 0 and target m.

In the four-target problem, it is assumed that the radar system processing results in measurements of the $\alpha_m$, $\Psi_m$, and $\Delta_m$, a total of 10 parameters in all. The four-target problem is to determine the location of the targets from this given information.

Equations relating the measured parameters to the target $\beta$ angles are developed in a similar manner as in the two-target case. One obtains six equations, $$\Psi_m = \beta_0 - \beta_m + \alpha_0 - \alpha_m \mod 2\pi \qquad (27)$$

$$\Delta_m = \frac{r_t[\sin(\beta_0+\alpha_0-\alpha_t)+\sin(\alpha_0-\alpha_t)]}{\sin\beta_0} - \frac{r_t[\sin(\beta_m+\alpha_m-\alpha_t)+\sin(\alpha_m-\alpha_t)]}{\sin\beta_m}$$

with $m=1,2,3$ involving the four unknown $\beta$ angles and the system parameters $r_t$ and $\alpha_t$. With these variables determined, the target range parameters could be obtained using (3).

As in the two-target case, the solution technique converts these equations into an equivalent set of expressions involving complex variables. Define $\Psi_0$ and $\Delta_0$ to be zero. Define analogs for the target $\beta$ angles, the measured data parameters, and the system parameters by the formulas $$Y_m=e^{i\beta_m} B_m=e^{i\alpha_m} C_m=d^{i\Psi_m} R=r_t e^{i\alpha_t} \qquad (28)$$

where $m=0,1,2,3$. For convenience set $X=Y_0=e^{i\beta_0}$ and $A=B_0=d^{i\alpha_0}$, and define the parameters $K_m$, $m=0,1,2,3$ by the formula $$K_m = A^* B_m C_m. \qquad (29)$$

In terms of these newly defined variables, the equations involving $\Psi_m$ in (27) become $$Y_m = K_m^* X \qquad (30)$$

where $m=0,1,2,3$. (For the case $m=0$, the formula reduces to $Y_0=X$ since $C_0$ and $K_0$ are both unity.) The range sum $u_m$ for each target is given by (10) in terms of the complex parameters. Although, as was pointed out earlier, this formula is valid only if the target is located off the external rays determined by the transmitter and receiver location, transposing the denominator results in the formula $$(Y_m-1)u_m = Y_m B_m R^* - B_m^* R \qquad (31)$$

which is satisfied for any location of the target. (If target m is located on one of the rays, $Y_m=1$ and $B_m R^*$ must be real. In this case, the conjugates $B_m R^*$ and $B_m^* R$ are equal and (31) is satisfied.) Multiplying the defining equation $\Delta_m = u_0 - u_m$ on both sides by $Y_m - 1$ and substituting for $u_m$ using (31) results in the equation $$(Y_m-1)\Delta_m = (Y_m-1)u_0 + B_m^* R - Y_m B_m R^* \qquad (32)$$

for $m=0,1,2,3$ which must be satisfied for any target geometry. These equations can be considered the complex counterparts to the equations in (27) involving $\Delta_m$.

Equations (32) and (30) can be combined; substituting $Y_m$ from (30) into (32) and multiplying through by $K_m$, one is led to the equation $$(X-K_m)\Delta_m = (X-K_m)u_0 + K_m B_m^* R - X B_m R^*. \qquad (33)$$

This formula represents four equations ($m=0,1,2,3$) in the variables X, $u_0$, and R that must be satisfied by any target geometry which solves the four-target problem for a given data set. The variables represent respectively the complex $\beta$ angle and range sum for target 0, and the radar system location parameter. The following subsection demonstrates how these equations can be solved. The resulting values for X can be substituted into (30) to determine the complex $\beta$ parameters $Y_m$. Provided these parameters are not real, (9) can be used with the value for R to solve for the target range parameters $r_m$ and $s_m$.

Furthermore, given any solution [X, $u_0$, R] of (33), provided that X has modulus 1, $u_0$ is real, the parameters $Y_m$ calculated by (30) each satisfy $\operatorname{Im}(Y_m)\neq 0$, and the $r_m$ and $s_m$ parameters calculated by (9) are all positive, then the geometry specified by the computed range parameters and radar system location parameter solves the four-target problem. Except for certain degenerate and special case geometries, this solution technique completely solves the four-target problem.

Equation (33) represents four equations in the variables X, $u_0$ and R which must be satisfied by the variables associated with any target geometry that solves the four-target problem. These equations can be rearranged and put into the matrix form $$[X-K_m, K_m B_m^*, -XB_m, (X-K_m)\Delta_m] \begin{pmatrix} u_0 \\ R \\ R^* \\ -1 \end{pmatrix} = \begin{pmatrix} 0 \\ 0 \\ 0 \\ 0 \end{pmatrix} \qquad (34)$$

The expression in the square brackets represents a 4×4 matrix. Each item (such as $X-K_m$) denotes one column of the matrix; the elements of the rows are generated as the index m ranges from 0 to 3.

This formulation shows that the vector $(u_0, R, R^*, -1)^t$ is a nonzero element in the kernal of the matrix, a situation which is possible only if the matrix is singular. (Recall that the kernel of a matrix M is the set of all vectors v such that $Mv=0$.) Hence, if [X, $u_0$, R] is any solution of (34), the determinant of the matrix evaluated at X must necessarily be zero. By factoring out the common factor $-X$ from each element of the third column, the determinant can be written $$\det[X-K_m, K_m B_m^*, -XB_m, (X-K_m)\Delta_m] = -XQ(X) \qquad (35)$$

where Q(X) is defined by the formula $$Q(X) = \det[X-K_m, K_m B_m^*, B_m, (X-K_m)\Delta_m]. \qquad (36)$$

Since for any valid solution $|X|=1$, one concludes that $Q(X)=0$ must be satisfied by the complex variables associated with any physical solution to the four-target problem.

In (36), since X appears linearly in two of the columns, the equation $Q(X)=0$ represents a quadratic equation in the variable X. An expansion for Q(X) is derived by simplifying the determinant using elementary row and column operations.

$$Q(X) = \det \begin{bmatrix} X-1 & A^* & A & 0 \\ X-K_m & A^*C_m & B_m & (X-K_m)\Delta_m \end{bmatrix} \quad (37)$$

$$= (A^*)^3 \det \begin{bmatrix} X-1 & A^* & A & 0 \\ A(X-K_m)-B_m(X-1) & C_m-A^*B_m & 0 & A(X-K_m)\Delta_m \end{bmatrix}$$

$$= \det[(X-K_m)-A^*B_m(X-1), C_m-A^*B_m, (X-K_m)\Delta_m]$$

$$= \det[(1-C_m)X-(K_m-C_m), C_m-K_mC_m^*, (X-K_m)\Delta_m]$$

In the first line, the matrix is rewritten to explicitly indicate the values for the first row. The second line is obtained by multiplying the second through fourth rows (m=1,2,3) by A and then subtracting from the result $B_m$ times the first row. The $A^*$ factors compensate for the multiplications by A. The third line results by expanding the determinant about the third column and absorbing the remaining $A^*$ factors in the first and third columns. The final line is obtained by subtracting $(X-1)$ times the second column from the first.

The matrix in the final expression is just 3×3. The determinant of any 3×3 matrix M is given by the formula $\det M = (M_1 \times M_2) \cdot M_3$ where $M_1$, $M_2$, and $M_3$ are the columns of the matrix, $M=[M_1, M_2, M_3]$ and × and · are the cross and dot product operators, respectively. Define the vectors $\lambda$ and $\mu$ by the formulas $$\lambda = (1-C_m) \times (C_m - K_m C_m^*)$$

$$\mu = (K_m - C_m) \times (C_m - K_m C_m^*) \quad (38)$$

where the index m=1,2,3. The cross product of the first two columns of the final matrix in (37) becomes $\lambda X - \mu$, and applying the above expansion formula, one obtains $$Q(X) = \sum_{m=1}^{3} (\lambda_m X - \mu_m)(X-K_m)\Delta_m. \quad (39)$$

The expanded version of this equation is $$Q(X) = Q_2 X^2 + Q_1 X + Q_0 \quad (40)$$

where the coefficients are given by the formulas $$Q_2 = \sum_{m=1}^{3} \Delta_m \lambda_m \quad (41)$$

$$Q_1 = \sum_{m=1}^{3} (-\Delta_m)(\lambda_m K_m - \mu_m)$$

$$Q_0 = \sum_{m=1}^{3} (\Delta_m K_m \mu_m).$$

Given X that satisfied $Q(X)=0$, the problem remains to find pairs $[u_0, R]$ which solve equation (34). This will be done by considering a slightly more general problem. Introduce a new variable P for $R^*$ and consider the matrix equation $$[X-K_m, K_m B_m^*, -XB_m, (X-K_m)\Delta_m] \begin{pmatrix} u_0 \\ R \\ P \\ -1 \end{pmatrix} = \begin{pmatrix} 0 \\ 0 \\ 0 \\ 0 \end{pmatrix} \quad (42)$$

in the independent variables X, $u_0$, R and P. Any solution of (42) also solves (34) provided the additional condition $P=R^*$ is met. However, consideration of this constraint is deferred until later.

Pick X so that $Q(X)=0$ and assume $|X|=1$. Equation (42) is simplified through row operations similar to those used in dealing with $Q(X)$. First rewrite (42) explicitly showing the components of the first row.

$$\begin{bmatrix} X-1 & A^* & -XA & 0 \\ X-K_m & A^*C_m & -XB_m & (X-K_m)\Delta_m \end{bmatrix} W = 0. \quad (43)$$

The vector W is introduced for notational convenience, $W=(u_0, R, P, -1)^t$. Multiply rows 2, 3, and 4 (m=1,2,3) by A and subtract from the result $B_m$ times the first row to obtain the equivalent matrix equation $$\begin{bmatrix} X-1 & A^* & -XA & 0 \\ A(X-K_m)-B_m(X-1) & C_m-A^*B_m & 0 & A(X-K_m)\Delta_m \end{bmatrix} W = 0. \quad (44)$$

The equation represented by the first row can be separated from the rest and solved for P in terms of $u_0$ and R.

$$P = A^*(1-X^*)u_0 + (A^*)^2 X^* R \quad (45)$$

The equations represented by the remaining three rows, after multiplication by $A^*$, can be put into the matrix form $$[(1-K_m C_m^*)X - K_m(1-C_m^*), A^*(C_m - K_m C_m^*), (X-K_m)\Delta_m] \begin{pmatrix} u_0 \\ R \\ -1 \end{pmatrix} = 0. \quad (46)$$

The value for X has been chosen to insure that the matrix in (43) is singular. The matrix in (44) is row equivalent to (43) and so is likewise singular. In (44), an expansion of the determinant of the matrix about the third column shows that, since $XA \neq 0$, the matrix in (46) is singular as well. If the first and second columns in (46) are independent, the kernel of the matrix must have dimension one, and the third column is expressible as a unique linear combination of the first two columns. In this situation, there is a unique solution for $u_0$ and R that satisfies (46), and with P given by (45), a unique solution $[u_0, R, P]$ is obtained that satisfies (42).

Let M denote the matrix in (46) and let $M_1$, $M_2$, and $M_3$ denote its columns, $M=[M_1, M_2, M_3]$. The condition that the columns $M_1$ and $M_2$ are independent is equivalent to the condition that their cross product in nonzero, $M_1 \times M_2 \neq 0$. Assuming this situation, writing equation (46) in vector form, $M_1 u_0 + M_2 R = M_3$, and forming a cross product with $M_1$ and $M_2$ from the left and right, one obtains the vector equations $$(M_1 \times M_2)R = M_1 \times M_3$$

$$(M_1 \times M_2)u_0 = M_3 \times M_2 \quad (47)$$

These equations can be solved for $u_0$ and $R$ giving $$R = \frac{(M_1 \times M_3)_m}{(M_1 \times M_2)_m} \quad u_0 = \frac{(M_3 \times M_2)_m}{(M_1 \times M_2)_m} \quad (48)$$

where the subscript m refers to the mth component of each vector. The computation is valid for any index m for which $(M_1 \times M_2)_m \neq 0$.

If $\bar{\lambda}$ and $\bar{\mu}$ are defined by the formulas $$\bar{\lambda} = (1 - K_m C^*_m) \times A^*(C_m - K_m C^*_m)$$

$$\bar{\mu} = K_m(1 - C^*_m) \times A^*(C_m - K_m C^*_m) \quad (49)$$

the cross product of the first two columns in (46) becomes $M_1 \times M_2 = \bar{\lambda}X - \bar{\mu}$. Adding a multiple of one vector in a cross product to the other does not change the value of the product. In (49), if the right vector in each equation is scaled by $-A$ and added to the left, one obtains the formulas $$\bar{\lambda} = (1 - C_m) \times A^*(C_m - K_m C^*_m) = A^*\lambda$$

$$\bar{\mu} = (K_m - C_m) \times A^*(C_m - K_m C^*_m) = A^*\mu \quad (50)$$

which leads to the formula $M_1 \times M_2 = A^*(\lambda X - \mu)$. If H is defined as a vector by $$H_m = (A - B_m)X + B_m(1 - C_m) \quad (51)$$

and F and G are defined by $$F = H_m \times (X - K_m)\Delta_m$$

$$G = (X - K_m)\Delta_m \times (C_m - K_m C^*_m) \quad (52)$$

after some manipulation, one obtains $M_1 \times M_3 = A^*F$ and $M_3 \times M_2 = A^*G$. Substitution into (48) leads finally to $$R = F_m/(\lambda_m X - \mu_m)$$

$$u_0 = G_m/(\lambda_m X - \mu_m) \quad (53)$$

valid for any index m for which $\lambda_m X - \mu_m \neq 0$.

In summary, for a given value of X that satisfies $Q(X) = 0$, provided $|X| = 1$ and $\lambda X - \mu \neq 0$, there is unique solution for $u_0$, R and P that satisfies equation (42). The solution for $u_0$, R and P is given by equations (53) and (45).

As mentioned earlier, any solution $[X, u_0, R, P]$ of (42) also solves (34) provided the additional condition $P = R^*$ is met. It will now be shown that provided $|X| = 1$ and $\lambda X - \mu \neq 0$, this constraint is automatically satisfied. Thus, for any X satisfying the above conditions ($Q(\chi) = 0$, $|X| = 1$, $\lambda X - \mu \neq 0$), if $u_0$ and R are given by (53), the triple $[X, u_0, R]$ is the unique solution of (34) for this value of X.

Consider any solution $[X, u_0, R, P]$ of (42), and assume the conditions $|X| = 1$ and $\lambda X - \mu \neq 0$ are satisfied. As shown earlier, these conditions imply that with X fixed, the values for $u_0$, R and P are uniquely determined. As with any solution, the values for the variables must satisfy the four equations represented by the defining equation $$[X - K_m, K_m B^*_m, -B_m X, (X - K_m)\Delta_m]W = 0 \quad (54)$$

where $W = (u_0, R, P, -1)^t$. Multiplying each equation by $X^*$, the following matrix formulation is obtained which must also be satisfied.

$$[1 - K_m X^*, K_m B^*_m X^*, -B_m, (1 - K_m X^*)\Delta_m]W = 0 \quad (55)$$

By conjugating each equation, one obtains $$[1 - K^*_m Z, K^*_m B_m X, -B^*_m, (1 - K^*_m X)\Delta_m]W^* = 0. \quad (56)$$

Multiplying equation m by $-K_m$ (m=0,1,2,3), one obtains $$[X - K_m, -B_m X, K_m B^*_m, (X - K_m)\Delta_m]W^* = 0. \quad (57)$$

Finally, reordering the second and third variables, one is led to the equation $$[X - K_m, K_m B^*_m, -B_m X, (X - K_m)\Delta_m]\hat{W} = 0 \quad (58)$$

which must be satisfied where $\hat{W} = (u^*_0, P^*, R^*, -1)^t$. The matrix appearing in (58) is the same as in (54) and, hence, by the uniqueness of the solution, $W = \hat{W}$ and one concludes that $u_0$ must be real and $P = R^*$.

When solving the quadratic $Q(X) = 0$, provided the leading coefficient is nonzero, two solutions $x_1$ and $x_2$ are obtained. These values for X are used in (30) to obtain candidate solutions $Y_m$ for the target complex $\beta$ parameters. Only solutions with $|Y_m| = 1$ can correspond to real physical geometries. Since each $K_m$ has modulus 1, $|X| = |Y_m|$ for each m. It can be shown that the quadratic and constant coefficients in $Q(X)$ are related by the formula $$Q_0 = -\left(\prod_m K_m\right) Q_2^*. \quad (59)$$

Hence, $|Q_0| = |Q_2|$ and, in general, $|x_1| \cdot |x_2| = 1$. One concludes that the values for $Y_m$ computed from $x_1$ and $x_2$ either all have modulus 1, or none of them do. In the latter case, no physical geometry solves the four-target problem and the data set is inconsistent. (Such data sets do exist; an example is given by $\alpha_0 = 4°$, $\alpha_1 = 17°$, $\alpha_2 = 42°$, $\alpha_3 = 58°$, $\Psi_1 = 7°$, $\Psi_2 = 15°$, $\Psi_3 = 22°$, $\Delta_1 = 2$, $\Delta_2 = 5$, $\Delta_3 = 9$.)

The solution technique presented for solving equation (34) can have just two major difficulties. The quadratic coefficient $Q_2$ can turn out to be zero presenting problems in solving $Q(X) = 0$, or the vector $\lambda X - \mu$ can turn out to be identically zero making (53) impossible to evaluate. In a situation where $Q_2 = 0$, since $|Q_2| = |Q_0|$, the constant term vanishes as well. Since any legitimate solution must satisfy $|X| = 1$, one concludes that if $Q_2 = 0$, either all three coefficients vanish simultaneously or the data set is inconsistent. In the case where the coefficients all vanish, the quadratic gives no information regarding the value of X and the solution method fails. This is the case if the position of two or more targets conincide or if more than one target is located on the line segment joining the transmitter and receiver. These situations represent degenerate geometries where, it is believed, an infinite set of target positions satisfy a given measurement data set. Likewise, it is not known exactly what geometries result in the condition $\lambda X - \mu = 0$. (Certain apparently degenerate geometries, however, do not fall into these categories. For example, a geometry defined with one target on the segment joining the transmitter and receiver, two targets on the exterior rays, and the fourth target elsewhere can be solved.)

Aside from these degeneracies, the method presented for solving (34) is complete and results in a solution $[X, u_0, R]$ for each root X of the quadratic $Q(X)$. Each value of X can be substituted into (30) to determine candidate target $Y_m$ values. The target range parameters can be obtained using (9) for any target m satisfying $\text{Im}(Y_m) \neq 0$. If $\text{Im}(Y_m) \neq 0$ for each m and if the computed range parameters are all positive, the target positions specified by these parameters solve the four-target problem. In cases where one or more of the target $Y_m$ values are real, solution for the target positions can be obtained using a similar procedure as was presented in the two-target problem.

A step-by-step algorithm is presented for solution of the four-target problem. For a given data set, the algorithm finds all nondegenerate solutions which have the targets located off the extended line connecting the transmitter and receiver.

1. Define the following complex numbers to represent the angular data:

$$A = B_0 = e^{i\alpha_0} B_m = e^{i\alpha_m} C_m = e^{i\Psi_m} \text{ for } m=1,2,3.$$

2. Evaluate the parameters $K_m$:

$$K_0 = 1 K_m = A^* B_m C_m \text{ for } m=1,2,3.$$

3. Evaluate the parameters $\lambda_m$ and $\mu_m$:

$$\lambda_m = (K_{m+2} C^*_{m+2} C_{m+1} - K_{m+1} C^*_{m+1} C_{m+2}) + (C_{m+2} - C_{m+1}) + (K_{m+1} C^*_{m+1} - K_{m+2} C^*_{m+2})$$

$$\mu_m = (K_{m+2} C^*_{m+2} C_{m+1} - K_{m+1} C^*_{m+1} C_{m+2}) + K_{m+1} K_{m+2} (C^*_{m+1} - C^*_{m+2}) + (K_{m+1} C_{m+2} K_{m+2} C_{m+1})$$

These expressions must be evaluated for m=1,2,3. The indices on the right should be interpreted modulo 3. For example, for m=2, m+1=3 and m+2=1. Similarly, when m=3, m+1=1, and m+2=2. These formulas result by expanding the cross product representations for $\lambda$ and $\mu$ given in (38).

4. Evaluated the variables $Q_2$, $Q_1$ and $Q_0$:

$$Q_2 = \sum_{m=1}^{3} \Delta_m \lambda_m$$

$$Q_1 = \sum_{m=1}^{3} (-\Delta_m)(\lambda_m K_m + \mu_m)$$

$$Q_0 = \sum_{m=1}^{3} (\Delta_m K_m \mu_m)$$

5. Form the following quadratic equation and solve it for X.

$$Q_2 X^2 + Q_1 X + Q_0 = 0$$

Call the solutions $x_1$ and $x_2$. (If the leading coefficient $Q_2$ is zero, the geometry is degenerate and the solution method fails.)

6. Check that the following condition is satisfied:

$$|x_1|^2 = 1$$

The expression $|x_1|^2$ represents the square of the magnitude of $x_1$ and is computed as the sum of the squares of its components. Using floating point arithmetic, an expression of the form $||_1|^2 - 1| < \epsilon$ should be evaluated for some suitably small $\epsilon$. For single precision calculations, $\epsilon = 10^{-5}$ should work. If this constraint fails, no valid geometry corresponds to the data set, and the data set is inconsistent. Assuming this condition is met, do steps 7 through 11 for $X = x_1$ and $X = x_2$.

7. Evaluate the variables $H_m$:

$$H_m = X(A - B_m) + B_m (1 - C_m)$$

This formula can be evaluated for m=1,2,3. However, evaluation at only two of these indices is needed. See the discussion in step 8.

8. Calculate the radar system position parameter R:

$$R = [\Delta_{m+2}(X - K_{m+2}) H_{m+1} - \Delta_{m+1}(X - K_{m+1}) H_{m+2}] / (\lambda_m X - \mu_m)$$

This formula is valid for m=1,2,3 provided the factor in the denominator does not vanish. As before, the indices on the right are computed modulo 3. This is the only place that the $H_m$ variables are needed; hence, only two of them need be calculated. The formula results from (53) after substitution for F using (52) and expansion of the cross product operation. The components of $\lambda X - \mu$ are typically all nonzero and evaluation using any value for m will work. However, if one or more of the components are zero, the index must be chosen so that the denominator does not vanish. If $\lambda X - \mu$ is identically zero, the geometry is degenerate and the algorithm fails.

9. Compute the target complex $\beta$ variables $Y_m$:

$$Y_m = K_m^*$$

for $$m = 0,1,2,3.$$

10. Compute candidate target range parameters:

$$r_m = \frac{\text{Im}(R^* B_m Y_m)}{\text{Im}(Y_m)} \quad s_m = \frac{\text{Im}(R^* B_m)}{\text{Im}(Y_m)} \text{ for } m = 0,1,2,3.$$

These computations require that $\text{Im}(Y_m) \neq 0$. If $Y_m$ is real for some m, the corresponding target either lies along the extended line containing the transmitter and receiver or the original data is inconsistent. These cases are not handled by this algorithm.

11. Check the validity of the solution:

Verify that $r_m > 0$ and $s_m > 0$ for m=0,1,2,3. If the $r_m$ and $s_m$ are all positive, the target locations specified by these parameters solve the problem. If any of these tests fail, this value for X can be rejected and does not correspond to any physical solution.

For a given data set, the algorithm results in either zero, one or two solutions to the four-target problem. When two solutions are obtained, both are equally valid in that their associated geometries satisfy all the input measurement conditions. In this case, additional information is required to determine the true physical solution to the problem. The correct solution can often be determined from a priori knowledge of the approximate relative location of the transmitter and receiver.

Two Target/Two Transmitter Problem (No DF)

Figure 9:
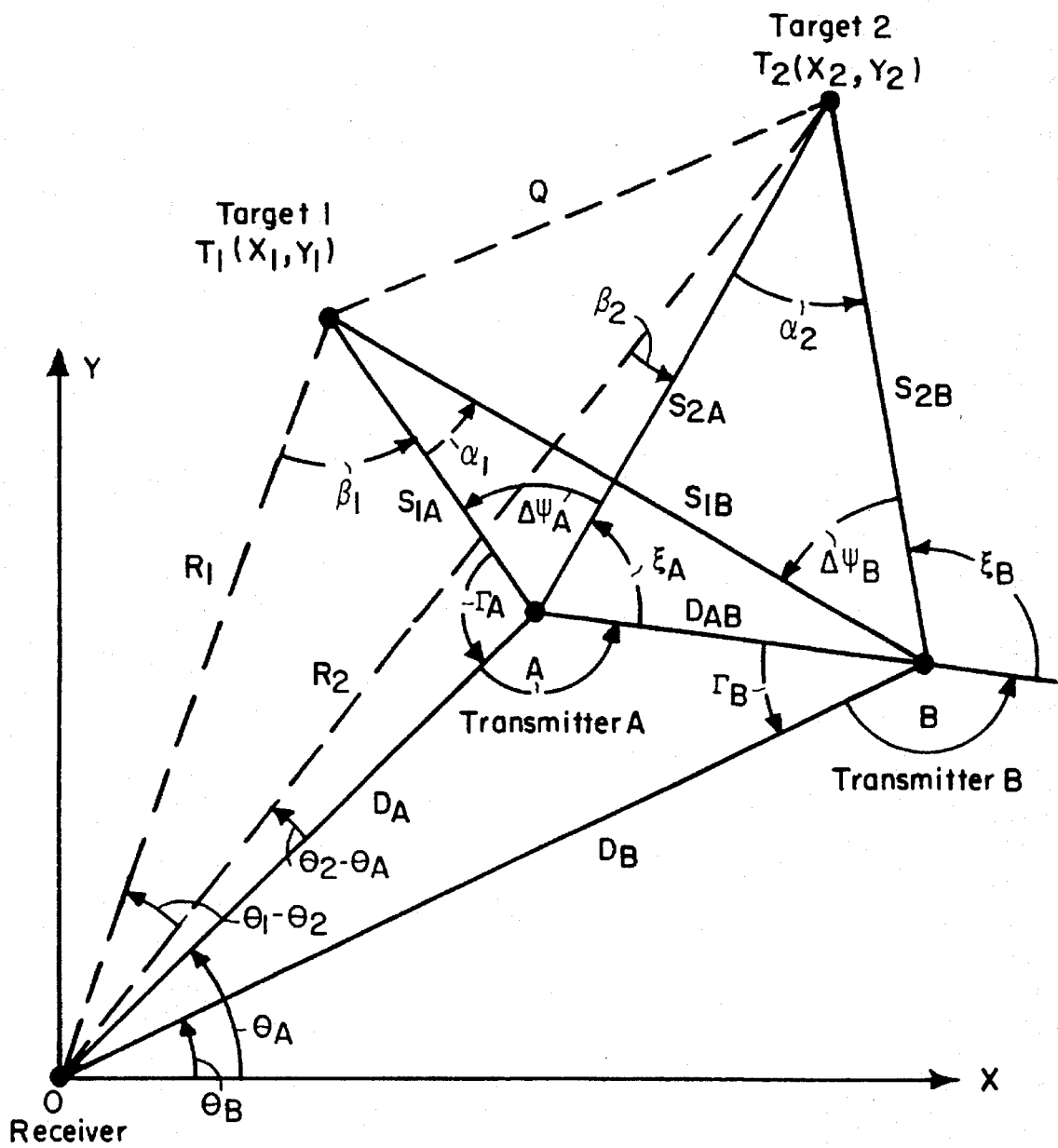
FIG. 9 is a depiction of the two target/two transmitter problem illustrating the parameters used in the analysis.

The geometry and mathematics of the Two Target/Two Transmitter problem is depicted in FIG. 9. A receiver located at the origin acquires differential time of arrival (DTOA) information from two targets $T_1$ and $T_2$ that are responding to two transmitters at sites A and B. No bearing information on the targets relative to the receiver is known.

From the timing information, values $\Delta t_A$ and $\Delta t_B$, corresponding to range-sum differences at sites A and B are deduced and expressed as $$(R_1 + S_{1A}) - (R_2 + S_{2A}) = C_0 \Delta t_A = g_A \tag{60a}$$

and $$(R_1 + S_{1B}) - (R_2 + S_{2B}) = C_0 \Delta t_B = g_B \tag{60b}$$

where $C_0$ is the speed of light.

One equivalent relation independent of the ranges is obtained by subtracting equations (60a) and (60b), viz., $$(S_{1A}-S_{1B})-(S_{2A}-S_{2B})=g_A-g_B \qquad (60c)$$

Assuming the rotation rates of the transmitters are known, the receiver can also deduce the angle spreads, $\Delta\psi_A$ and $\Delta\psi_B$, between the two targets, as seen from sites A and B.

With this information the problem is stated as follows: Given transmitter site locations A and B, the times $\Delta t_A$ and $\Delta t_B$, and the angle spreads $\Delta\psi_A$ and $\Delta\psi_B$, find the locations of targets $T_1$ and $T_2$.

We derive a system of four equations in four unknown angles, the solution of which will allow reconstruction of the target coordinant locations $(X_1, Y_1)$ and $(X_2, Y_2)$. In triangle $AT_1B$, from the law of sines $$\frac{D_{AB}}{\sin(\alpha_1)} = \frac{S_{1B}}{\sin(\Delta\Psi_A+\xi_A)} = \frac{S_{1A}}{\sin(\pi-\alpha_1-\xi_A-\Delta\Psi_A)} \qquad (61a)$$

In triangle $AT_2B$, from the law of sines $$\frac{D_{AB}}{\sin(\Delta\Psi_B+\pi-\alpha_1\Delta\Psi_A)} = \frac{S_{2B}}{\sin(\xi_A)} = \frac{S_{2A}}{\sin(\Delta\Psi_B+\pi-\alpha_1-\xi_A-\Delta\Psi_A)} \qquad (61b)$$

Equations (61a) and (61b) allow expression of the distances $S_{1A}$, $S_{1B}$, $S_{2A}$, $S_{2B}$ in terms of unknown angles $\alpha_1$ and $\xi_A$, viz., $$S_{1A} = \frac{D_{AB}\sin(\alpha_1+\xi_A+\Delta\Psi_A)}{\sin(\alpha_1)}, \qquad (62a)$$

$$S_{1B} = \frac{D_{AB}\sin(\Delta\Psi_A+\xi_A)}{\sin(\alpha_1)}, \qquad (62b)$$

$$S_{2A} = \frac{D_{AB}\sin(\alpha_1+\xi_A+\Delta\Psi_A-\Delta\Psi_B)}{\sin(\alpha_1+\Delta\Psi_A-\Delta\Psi_B)}, \qquad (62c)$$

$$S_{2B} = \frac{D_{AB}\sin(\xi_A)}{\sin(\alpha_1+\Delta\Psi_A-\Delta\Psi_B)}. \qquad (62d)$$

The range from the receiver to target 1 is obtained from the law of sines in triangle $OT_1A$ as $$\frac{R_1}{\sin(\Gamma_A)} = \frac{D_A}{\sin(\beta_1)}$$

where $$\Gamma_A = 2\pi - A - \xi_A - \Delta\psi_A. \qquad (63a)$$

In rewritten form $$R_1 = \frac{-D_A \sin(\xi_A+\Delta\Psi_A+A)}{\sin\beta_1}. \qquad (63b)$$

From the law of sines in triangle $OT_1B$, $R_1$ is also obtained as $$\frac{R_1}{\sin(\Gamma_B-(\pi-\alpha_1-\xi_A-\Delta\Psi_A))} = \frac{D_B}{\sin(\beta_1+\alpha_1)} \qquad (63c)$$

or $$R_1 = \frac{-D_B \sin(W_{AB}+\alpha_1+\xi_A+\Delta\Psi_A)}{\sin(\beta_A+\alpha_1)} \qquad (63d)$$

where $W_{AH}=A+\theta_A-\theta_B$ and $\Gamma_B=\pi-W_{AH}$.

Equating $R_1$ in equations (63b) and (63d) we establish a relation between the unknown angles $\alpha_1$, $\xi_A$, and $\beta_1$, $$\frac{D_A \sin(\xi_A+\Delta\Psi_A+A)}{\sin(\beta_A)} = \frac{D_B \sin(W_{AB}+\alpha_1+\xi_A+\Delta\Psi_A)}{\sin(\beta_1+\alpha_1)} \qquad (64)$$

In a similar way, the range from the receiver to target 2 is obtained from the law of sines in triangle $OT_2A$ as $$\frac{R_2}{\sin(\Gamma_A+\Delta\Psi_A)} = \frac{D_A}{\sin(\beta_2)} \qquad (65a)$$

or $$R_2 = \frac{-D_A \sin(A+\xi_A)}{\sin\beta_2}, \qquad (65b)$$

and from the law of sines in triangle $OT_2B$ as $$\frac{R_2}{\sin(\Gamma_B+\pi-\alpha_1-\xi_A-\Delta\Psi_A)} = \frac{D_B}{\sin(\beta_2+\alpha_1+\Delta\Psi_A-\Delta\Psi_B)} \qquad (65c)$$

or $$R_2 = \frac{-D_B \sin(\alpha_1+\xi_A+W_{AB}+\Delta\Psi_A-\Delta\Psi_B)}{\sin(\beta_2+\alpha_1+\Delta\Psi_A-\Delta\Psi_B)} \qquad (65d)$$

Equating $R_2$ in equations (65b) and (65d), we establish a relation between the unknown angles $\alpha_1$, $\xi_A$ and $\beta_2$ as $$\frac{D_A \sin(A+\xi_A)}{\sin(\beta_2)} = \frac{D_B \sin(\alpha_1+\xi_A+W_{AB}+\Delta\Psi_A-\Delta\Psi_B)}{\sin(\beta_2+\alpha_1+\Delta\Psi_A-\Delta\Psi_B)} \qquad (66)$$

Two additional relations expressed in terms of angles $\alpha_1$, $\xi_A$, $\beta_1$, and $\beta_2$ are obtained by substituting for $R_1$, $R_2$, $S_{1A}$, $S_{1B}$, $S_{2B}$ in the distance-time relations (60a) and (60c). Relation (60a) becomes $$D_A \left[ \frac{\sin(\xi_A+A)}{\sin(\beta_2)} - \frac{\sin(\xi_A+\Delta\Psi_A+A)}{\sin(\beta_1)} \right] + D_{AB}\left[ \frac{\sin(\xi_A+\alpha_1+\Delta\Psi_A)}{\sin(\alpha_1)} - \frac{\sin(\xi_A+\alpha_1+\Delta\Psi_A-\Delta\Psi_B)}{\sin(\alpha_1+\Delta\Psi_A-\Delta\Psi_B)} \right] = g_A. \qquad (67)$$

In a similar way relation (60c) is expressed as $$\frac{D_{AB}}{\sin(\alpha_1)}[\sin(\alpha_1+\xi_A+\Delta\Psi_A)-\sin(\xi_A+\Delta\Psi_A)] - \frac{D_{AB}}{\sin(\alpha_1+\Delta\Psi_A-\Delta\Psi_B)}[\sin(\alpha_1+\xi_A+\Delta\Psi_A-\Delta\Psi_B)-\sin(\xi_A)] = g_A - g_B. \qquad (68)$$

The non-linear relations (64), (66), (67), and (68) comprise a system of four equations in the four unknowns ($\alpha_1$, $\xi_1$, $\beta_1$, and $\beta_2$).

Given a solution of system (64), (66), (67), and (68), the range, $R_1$ and $R_2$ to each target is obtained by substituting the appropriate solution values into (63d) and (65b), respectively. The bearings to targets 1 and 2 are obtained from the angle relations $$\theta_1=\pi+\theta_A-\beta_1-\Gamma_A$$

and $$\theta_2=\pi+\theta_A-\beta_2-\Gamma_A-\Delta\psi_A \qquad (69)$$

where $\Gamma_A=2\pi-A-\xi_A-\Delta\psi_A$.

With $R_1$, $R_2$, $\theta_1$, and $\theta_2$, target coordinates $(x_1, y_1)$ and $(x_2, y_2)$ are recovered as $$(x_1, y_1)=(R_1 \cos(\theta_1), R_1 \sin(\theta_1)),$$

and $$(x_2, y_2) = (R_2 \cos(\theta_2), R_2 \sin(\theta_2)) \tag{70}$$

Thus, solution of (64), (66), (67), and (68) allows determination of the target coordinates $(x_1, y_1)$ and $(x_2, y_2)$. In this existing equation form, however, the variables are not easily uncoupled and solution is difficult.

The relations (64), (66), (67), and (68) are converted to analogous equations involving complex variables. In this new system, the equivalent variables can be uncoupled and solution is reduced to finding where a function of one variable assumes the value zero.

The old unknowns $(\alpha_1, \xi_A, \beta_1, \beta_2)$ are mapped into new unknowns $(x_1, x_2, x_3, x_4)$ defined by $$x_1 = e^{i\alpha_1}, x_2 = e^{i\xi_A}, x_3 = e^{i\beta_1}, x_4 = e^{i\beta_2} \text{ where } i = \sqrt{-1} \tag{71}$$

Equivalent complex constants are defined as $$Q_A = e^{i\Delta\psi_A}, Q_B = e^{i\Delta\psi_B}, \gamma_A = e^{iA}, \omega_{AH} = e^{iW_{AH}} \tag{72}$$

For any argument u, the relationship between $e^{iu}$ and sin(u) is $$\sin u = \frac{1}{2i} (e^{iu} - e^{-iu}) \tag{73}$$

Substituting relations (71), (72), and (73) in equation (64), one obtains $$x_3^2 = \frac{\left(\frac{D_A}{D_B}\right)(x_2^2 Q_A \gamma_A - Q^*_A \gamma^*_A) - (x_1^2 x_2^2 w_{AB} Q_A - w^*_{AB} Q^*_A)}{x_1^2 \left(\frac{D_A}{D_B}\right)(x_2^2 Q_A \gamma_A - Q^*_A \gamma^*_A) - (x_1^2 x_2^2 w_{AB} Q_A - w^*_{AB} Q^*_A)} \tag{74}$$

Equation (74) expresses $x_3$ in terms of $x_1$ and $x_2$.

Substituting relations (71), (72), and (73) in equation (66), one obtains $$x_4^2 = \frac{Q^*_A Q_B \left(\frac{D_A}{D_B}\right)(\gamma_A x_2^2 - \gamma^*_A) - x_1^2 s_2^2 w_{AB} Q_A Q^*_B - w^*_{AB} Q^*_A Q_B)}{x_1^2 Q_A Q^*_B \left(\frac{D_A}{D_B}\right)(\gamma_A x_2^2 - \gamma^*_A) - (x_1^2 x_2^2 w_{AB} Q_A Q^*_B - w^*_{AB} Q^*_A Q_B} \tag{75}$$

Equation (75) expresses $x_4$ in terms of $x_1$ and $x_2$.

Substituting relations (71), (72), and (73) in equation (67), one obtains $$\frac{x_4}{x_4^2 - 1} p_1 - \frac{x_3}{x_3^2 - 1} p_2 - p_3 = 0 \tag{76}$$

where $$p_1 = x_2^2 \gamma_A - \gamma^*_A$$

$$p_2 = x_2^2 Q_A \gamma_A - Q^*_A \gamma^*_A$$

$$p_3 = \frac{g_A}{D_A} x_2 + \frac{D_{AB}}{D_A} \left[ \frac{x_1^2 x_2^2 Q_A - Q^*_A}{1 - x_1^2} \right] - \frac{D_{AB}}{D_A} \left[ \frac{x_1^2 x_2^2 Q_A Q^*_B - Q^*_A Q_B}{Q^*_A Q_B - Q_A Q^*_B x_1^2} \right]$$

Since both $x_3$ and $x_4$ are functions of $x_1$ and $x_2$, then so is equation (76). Finally, substituting relations (71), (72), and (73) in equation (68), one obtains $$ax_1^2 + bx_1 + c = 0 \tag{77a}$$

where $$a = x_2^2 Q_A (Q_A - 1) - x_2 \frac{(g_A - g_B)}{D_{AB}} Q_A$$

$$b = x_2^2 Q_A (Q_B - 1) - x_2 \frac{(g_A - g_B)}{D_{AB}} (Q_A + Q_B) - (Q_B - 1)$$

$$c = Q_B \left[ (Q^*_A - 1) - \frac{(g_A - g_B)}{D_{AB}} x_2 \right]$$

the explicit solution(s) of (18a) are given by the quadratic formula as $$x_1 = \frac{-b}{2a} + \frac{\sqrt{b^2 - 4ac}}{2a} \text{ and } x_1 = \frac{-b}{2a} - \frac{\sqrt{b^2 - 4ac}}{2a} \tag{77b}$$

Equation (77) presents $x_2$ as an explicity function of $x_1$.

The analogous system of complex equations to be solved is (74), (75), (76), (77). These have the functional form $$x_1 = p(x_2) \tag{78a}$$

$$x_3^2 = g(x_1, x_2) \tag{78b}$$

$$x_4^2 = h(x_1, x_2) \tag{78c}$$

$$F(x_1, x_2, x_3, x_4) = 0 \tag{78d}$$

from which it is seen that F is an implicit function of the single variable $x_2$.

The algorithmic procedure for solution is as follows:
1. Choose $\xi_A$ on the interval $0 \leq \xi_A \leq 360°$.
2. Define $x_2 = e^{i\xi_A}$.
3. Define $x_1$ from (77b). (There are two choices for $x_1$.)
4. Define $x_3$ from (74). (There are two choices for $x_3$.)
5. Define $x_4$ from (75). (There are two choices for $x_4$.)
6. Substitute $(x_1, x_2, x_3, x_4)$ into the left side of equation (76).
7. Iterate for the values of $\xi_A$ which makes equation (76) equal zero.

Once a solution $(x_1, x_2, x_3, x_4)$ has been determined, the range from the receiver to target 1 is obtained from (63b) or its complex analog $$R_1 = \frac{-D_A Im(x_2 Q_A \gamma_A)}{Im(x_2)} \tag{79}$$

Similarly, range from the receiver to target 2 is obtained from (63d) or its complex analog $$R_2 = \frac{-D_B Im(w_{AB} x_1 x_2 Q_A)}{Im(x_1 x_2)} \tag{80}$$

Bearings to the targets 1 and 2 are obtained from (69) or the complex analogs $$\theta_1 = \text{Arg}(\gamma_A Q_A x_2 x_3^*) + \theta_A - \pi$$

and $$\theta_2 = \text{Arg}(\gamma_A x_2 x_4^*) + \theta_A - \pi \tag{81}$$

For certain target geometries, solutions cannot be obtained. The following geometries correspond to a division by zero in the mathematical equations and do not admit a solution:

Either target location is colinear with the line connecting transmitters A and B.

Either target location is colinear with the line connecting the receiver to transmitter A.

Either target location is colinear with the line connecting the receiver to transmitter B.

Both target locations are colinear with the receiver.

Both target locations are colinear with transmitter A.

Both target locations are colinear with transmitter B.

Three processing concepts have been presented in detail above. These presentations not only outlined the implementation concept but also pointed out various geometries that lead to mathematical expressions that do not yield location solutions because the mathematical expressions become ill-conditioned. In fact, once a geometry exists in any one of these algorithms that begins to produce a solution, the solution can be used to generate a transmitter signal estimate that is synchronous with the actual ground transmitter. This transmitter signal estimate (pulse train) is produced when the Pulse Group Propagation Time Correction algorithm 64 is implemented. The pulse train is enhanced when it is further processed in the Long Term PRF/PRI Estimator algorithm 66. As stated above, this pulse train (transmitter signal) can be used to drive a bistatic process (algorithm) to derive locations. For certain geometries, use of the Long Term PRF/PRI Estimator 66 in a bistatic algorithm eliminates the uncertainties that arise from instantaneous solutions.

The generation of the synchronous pulse train using the techniques described above will produce target location estimates under all geometric conditions that lead to bistatic solutions; that is, all geometries except those where the target is on the line between the transmitter and the receiver/processor.

What is claimed is:

1. Apparatus for locating at least two targets comprising:
    a transmitter of electromagnetic radiation for directing electromagnetic radiation to said at least two targets,
    a receiver of electromagnetic radiation for intercepting reflected electromagnetic radiation or transponded electromagnetic radiation from said at least two targets, said receiver not receiving electromagnetic radiation directly from said transmitter for subsequent processing,
    a processor operationally engaged to said receiver and independent of said transmitter for accepting signals from said receiver, said signals characterizing said reflected electromagnetic radiation or said transponded electromagnetic radiation from said at least two targets, and
    programs running in said processor for computing said locations of any of said at least two targets from said signals even though said receiver has not been manipulated to be synchronized with said transmitter.

2. The apparatus of claim 1 wherein said receiver has direction-finding capability.

3. The apparatus of claim 2 wherein the location of said transmitter is stored in said processor.

4. The apparatus of claim 3 wherein said processor is adapted to accept signals characterizing the radiation reflected or transponded from two targets and wherein said programs are adapted to compute the locations of said two targets.

5. The apparatus of claim 3 wherein said processor is adapted to accept signals characterizing the radiation reflected or transponded from three targets and wherein said programs are adapted to compute the locations of said three targets.

6. The apparatus of claim 2 wherein said processor is adapted to accept signals characterizing the radiation reflected or transponded from four targets and wherein said programs are adapted to compute the locations of said four targets and said transmitter.

7. Apparatus for locating at least two targets comprising:
    at least two transmitter of electromagnetic radiation for directing electromagnetic radiation to said at least two targets,
    a receiver of electromagnetic radiation for intercepting reflected electromagnetic radiation or transponded electromagnetic radiation from said at least two targets, said receiver not receiving electromagnetic radiation directly from said transmitter for subsequent processing,
    a processor operationally engaged to said receiver and independent of said transmitter for accepting signals from said receiver, said signals characterizing said reflected electromagnetic radiation or said transponded electromagnetic radiation only from said at least two targets, and
    programs running in said processor for computing said locations of any of said at least two targets from said signals, even though said receiver has not been manipulated to be synchronized with said transmitter.

8. The apparatus of claim 7 wherein the locations of said at least two transmitters are stored in said processor.

9. The apparatus of claim 8 wherein said processor is adapted to accept signals characterizing the radiation reflected or transponded from two targets and wherein said programs are adapted to compute the locations of said two targets.

10. Apparatus for locating at least two targets comprising:
    a transmitter of electromagnetic radiation for directing electromagnetic radiation in the form of pulses at a pulse repetition interval and a phase to said at least two targets,
    a receiver of electromagnetic radiation for intercepting reflected electromagnetic radiation or transponded electromagnetic radiation from said at least two targets, said receiver not receiving electromagnetic radiation directly from said transmitter for subsequent processing,
    a processor operationally engaged to said receiver and independent of said transmitter for accepting signals from said receiver, said signals characterizing said reflected electromagnetic radiation or said transponded electromagnetic radiation only from said at least two targets, and
    programs running in said processor for computing the pulse repetition interval and phase of the transmitted radiation, and for producing a signal simulating the transmitter pulses, and
    a bistatic processor for accepting signals characterizing said reflected electromagnetic radiation or said transponded electromagnetic radiation from said at least two targets and said signal simulating said transmitter pulses, and for computing said locations of any of said at least two targets, even though said receiver has not been manipulated to be synchronized with said transmitter.

11. The apparatus of claim 10 wherein said receiver has direction-finding capability.

12. The apparatus of claim 11 wherein the location of said transmitter is stored in said processor.

13. The apparatus of claim 12 wherein said processor is adapted to accept signals characterizing the radiation reflected or transponded from two targets and wherein said bistatic processor is adapted to compute the locations of said two targets.

14. The apparatus of claim 10 wherein the signals characterizing the electromagnetic radiation reflected or transponded from said targets accepted by said bistatic processor are accepted from a second receiver of electromagnetic radiation, said receiver not necessarily positioned within line-of-sight of said transmitter.

15. Apparatus for locating a transmitter which is directing electromagnetic radiation to at least two targets, comprising:

a receiver of electromagnetic radiation for intercepting reflected electromagnetic radiation or transponded electromagnetic radiation from said at least two targets, said receiver not receiving electromagnetic radiation directly from said transmitter for subsequent processing, a processor operationally engaged to said receiver and independent of said transmitter for accepting signals from said receiver, said signals characterizing the reflected electromagnetic radiation or transponded electromagnetic radiation from said at least two targets, and programs running in said processor for computing said location of said transmitter from said signals, even though said receiver has not been manipulated to be synchronized with said transmitter.

16. The apparatus of claim 15 wherein the locations of two targets are stored in said processor and wherein said processor is adapted to accept signals characterizing the radiation reflected or transponded from said two targets.

17. The apparatus of claims 1, 7, or 10 further comprising display means for displaying computed target location or locations.

18. The apparatus of claim 15 further comprising display means for displaying computed transmitter location.

19. The apparatus of claims 1, 7, or 10 further comprising means for inputting a computed target location into a control system guiding a projectile aimed at the target.

20. The apparatus of claim 15 further comprising means for inputting a computed transmitter location into a control system guiding a projectile aimed at the transmitter.

21. The apparatus of claims 1, 7, or 10 further comprising means for inputting a computed target location into a control system guiding target trajectory.

22. The apparatus of claim 15 further comprising means for inputting a computed transmitter location into a control system guiding transmitter trajectory.

23. Method for generating the location of at least two targets comprising the steps of:

providing a receiver characterized by an ability to receive electromagnetic radiation reflected and transponded from a target when said target is illuminated by a transmitter, allowing the receiver to receive electromagnetic radiation from said at least two targets illuminated by transmitted electromagnetic radiation from said transmitter under conditions where the receiver does not receive electromagnetic radiation directly from the transmitter and the receiver is not manipulated to be synchronized with the transmitter, and computing said locations of said at least two targets from said received electromagnetic radiation without receiving additional information directly from said transmitter.

24. Method for generating the locations at least two targets comprising the steps of:

providing a receiver characterized by an ability to receive electromagnetic radiation in the form of pulses at a pulse repetition interval and phase reflected and transponded from a target when said target is illuminated by a transmitter, allowing the receiver to receive said electromagnetic radiation from said at least two targets illuminated by transmitted electromagnetic radiation from said transmitter under conditions where the receiver does not receive electromagnetic radiation directly from the transmitter and the receiver is not manipulated to be synchronized with the transmitter, computing the pulse repetition interval and phase of the transmitted radiation from signals derived only from said received electromagnetic radiation, producing a signal simulating said transmitted electromagnetic radiation, and performing bistatic processing on said received electromagnetic radiation and said signal simulating said transmitted pulses to compute said locations of said at least two targets, said performing of bistatic processing without receiving additional information directly from said transmitter.

25. Method for generating a location of a transmitter comprising the steps of:

providing a receiver characterized by an ability to receive electromagnetic radiation in the form of pulses at a pulse repetition interval and phase reflected and transponded from a target when said target is illuminated by a transmitter, allowing the receiver to receive electromagnetic radiation from said at least two targets illuminated by transmitted electromagnetic radiation from said transmitter under conditions where the receiver does not receive electromagnetic radiation directly from the transmitter and the receiver is not manipulated to be synchronized with the transmitter, and computing said locations of any of said transmitter from said received electromagnetic radiation without receiving additional information directly from said transmitter.

26. Apparatus for locating targets, the apparatus comprising:

a receiver that only electromagnetic radiation signals reflected or transponded from targets that have been illuminated by a transmitter; and a computer that is operationally engaged with the receiver and independent of the transmitter, the computer running a program that extracts timing information from the received signals, whereby, when the receiver receives radiation from at least two targets, the program calculates the positions of those targets even though the receiver has not been manipulated to be synchronized with the transmitter.

* * * * *

UNITED STATES PATENT AND TRADEMARK OFFICE
CERTIFICATE OF CORRECTION

PATENT NO. : 5,614,912

DATED : March 25, 1997

INVENTOR(S) : Edmund J. Mitchell

It is certified that error appears in the above-indentified patent and that said Letters Patent is hereby corrected as shown below:

Column 10, line 51: please delete "$Y_1$"; and insert therefor -- $r_1$ --.

Column 10, line 51: please delete "$Y_i$"; and insert therefor -- $r_i$ --.

Column 10, line 60: please delete "$Y_i$"; and insert therefor -- $r_i$ --.

Column 11, line 19: please delete "$Y_i$ and $Y_1$"; and insert therefor -- $r_i$ and $r_1$ --.

Column 11, line 22: please delete "$Y_i+Y_1$"; and insert therefor -- $r_i+r_1$ --.

Column 11, line 28: please delete "$Y_i + Y_1$"; and insert therefor -- $r_i+r_1$ --.

Column 11, line 33: please delete "$Y_i + Y_1$"; and insert therefor -- $r_i+r_1$- --.

Column 11, line 35: please delete "$Y_1$"; and insert therefor -- $r_1$ --.

Column 15, line 22: please delete "$X=e^{i\theta 0} Y=E^{i\theta 1} A=e^{i\alpha 0} B=e^{i\alpha 1}$"; and insert therefor -- $X=e^{i\theta 0}$  $Y=E^{i\theta 1}$  $A=e^{i\alpha 0}$  $B=e^{i\alpha 1}$ --.

Column 15, line 32: please delete "$C=e^{i\Psi} K=$"; and insert therefor -- $C=e^{i\Psi}$ $K=$ --.

Column 16, line 37: please delete "$\Delta$"; and insert therefor -- $\tilde{\Delta}$ --.

Column 16, line 39: please delete "$\Delta=$"; and insert therefor -- $\tilde{\Delta}$ --.

Column 16, line 43: please delete ")$\Delta$]"; and insert therefor -- )$\tilde{\Delta}$ ] --.

UNITED STATES PATENT AND TRADEMARK OFFICE
CERTIFICATE OF CORRECTION

PATENT NO. : 5,614,912

DATED : March 25, 1997

INVENTOR(S) : Edmund J. Mitchell

It is certified that error appears in the above-indentified patent and that said Letters Patent is hereby corrected as shown below:

Column 17, line 54: please delete "$\Delta=0$" and insert therefor -- $\tilde{\Delta}=0$ --.

Column 17, line 56: please delete "$\Delta$" and insert therefor -- $\tilde{\Delta}$ --.

Column 17, line 60: please delete "$\Delta$" and insert therefor -- $\tilde{\Delta}$ --.

Column 18, line 4: please delete "$=\Delta$" and insert therefor -- $=\tilde{\Delta}$ --.

Column 18, line 13: please delete "AH" and insert therefor -- AB --.

Column 19, line 30: please delete "$Y_m=e^{i\theta m}B_m=e^{i\alpha}C_m=d^{\Psi m}R=r\rho^{i\alpha}{}_1$"; and insert therefor -- $Y_m=e^{i\theta_m} \quad B_m=e^{i\alpha_m} \quad C_m=d^{i\Psi_m} \quad R=r_i e^{i\alpha_i}$ --

Column 25, line 14: please delete "$A=B_0=e^{i\alpha 0}B_m=e^{i\alpha m}C_m=e^{i\Psi m}$ for m=1, 2, 3."; and insert therefor -- $A=B_0=e^{i\alpha 0} \quad B_m=e^{i\alpha m} \quad C_m=e^{i\Psi m}$ for m=1, 2, 3.

UNITED STATES PATENT AND TRADEMARK OFFICE
CERTIFICATE OF CORRECTION

PATENT NO. : 5,614,912

DATED : March 25, 1997

INVENTOR(S) : Edmund J. Mitchell

It is certified that error appears in the above-indentified patent and that said Letters Patent is hereby corrected as shown below:

Column 25, line 18: please delete "$K_0=1 K_m=A*B_m C_m$ for $m=1,2,3.$" and insert therefor -- $K_0=1 \quad K_m=A*B_m C_m$ for $m=1,2,3.$ --.

Signed and Sealed this

Fourteenth Day of October, 1997

Attest:

BRUCE LEHMAN

Attesting Officer

Commissioner of Patents and Trademarks